(12) United States Patent
Kishimoto et al.

(10) Patent No.: US 9,926,686 B2
(45) Date of Patent: Mar. 27, 2018

(54) WORK VEHICLE AND WORK VEHICLE EMERGENCY TRAVELLING METHOD

(71) Applicant: KOMATSU LTD., Tokyo (JP)

(72) Inventors: Yasuki Kishimoto, Hiratsuka (JP); Hiroshi Monden, Hiratsuka (JP); Shunsuke Miyamoto, Atsugi (JP); Yasunori Ohkura, Kawasaki (JP)

(73) Assignee: KOMATSU LTD., Tokyo (JP)

(*) Notice: Subject to any disclaimer, the term of this patent is extended or adjusted under 35 U.S.C. 154(b) by 191 days.

(21) Appl. No.: 14/905,377

(22) PCT Filed: Jan. 19, 2015

(86) PCT No.: PCT/JP2015/051260
§ 371 (c)(1),
(2) Date: Jan. 15, 2016

(87) PCT Pub. No.: WO2015/111549
PCT Pub. Date: Jul. 30, 2015

(65) Prior Publication Data
US 2016/0160470 A1     Jun. 9, 2016

(30) Foreign Application Priority Data

Jan. 27, 2014 (JP) ................................ 2014-012023

(51) Int. Cl.
*F16H 3/72* (2006.01)
*B60W 10/08* (2006.01)
(Continued)

(52) U.S. Cl.
CPC .............. *E02F 9/202* (2013.01); *B60K 6/365* (2013.01); *B60K 6/387* (2013.01); *B60K 6/445* (2013.01);
(Continued)

(58) Field of Classification Search
None
See application file for complete search history.

(56) References Cited

U.S. PATENT DOCUMENTS 7,967,711 B2 * 6/2011 Conlon ................ B60W 10/10
475/280
2005/0184529 A1 8/2005 Ueda
(Continued)

FOREIGN PATENT DOCUMENTS

EP    2 202 430 A1    6/2010
JP    2006-170120 A   6/2006
(Continued)

OTHER PUBLICATIONS

The International Search Report for the corresponding international application No. PCT/JP2015/051260, dated Apr. 21, 2015.
(Continued)

*Primary Examiner* — Robert W Hodge
*Assistant Examiner* — Ryan P Dodd
(74) *Attorney, Agent, or Firm* — Global IP Counselors, LLP

(57) ABSTRACT

A gear mechanism of a power train includes first and second planetary gear mechanisms, which respectively include first to third rotating elements and fourth to sixth rotating elements which are each different to each other. The transmission section transfers the drive force of the second rotating element to the fourth rotating element. A rotating shaft fixing section of a power train integrally operates the rotating shafts of the third and fifth rotating elements. A variable transmission section of a power train includes an input section where drive force is input and an output section configured to output drive force equal to or less than the input drive force. A drive force conversion control section of a controller controls the variable transmission section to enable the output of the engine to be converted to an
(Continued)

appropriate drive force and the converted drive force to be transferred to the output shaft.

14 Claims, 11 Drawing Sheets

(51) Int. Cl.
| | |
|---|---|
| *E02F 9/20* | (2006.01) |
| *B60K 6/365* | (2007.10) |
| *B60K 6/445* | (2007.10) |
| *B60K 6/54* | (2007.10) |
| *B60L 11/14* | (2006.01) |
| *B60W 10/02* | (2006.01) |
| *B60W 10/04* | (2006.01) |
| *B60W 10/06* | (2006.01) |
| *B60W 10/10* | (2012.01) |
| *B60W 10/101* | (2012.01) |
| *B60W 20/00* | (2016.01) |
| *B60L 1/00* | (2006.01) |
| *B60L 3/00* | (2006.01) |
| *B60L 3/04* | (2006.01) |
| *B60L 15/20* | (2006.01) |
| *B60K 6/387* | (2007.10) |
| *B60K 6/547* | (2007.10) |
| *B60L 11/18* | (2006.01) |
| *E02F 3/28* | (2006.01) |
| *E02F 9/02* | (2006.01) |
| *E02F 9/22* | (2006.01) |
| *F16H 61/02* | (2006.01) |
| *B60W 50/029* | (2012.01) |
| *B60K 1/02* | (2006.01) |
| *F16H 37/04* | (2006.01) |
| *B60K 6/48* | (2007.10) |
| *B60K 6/38* | (2007.10) |

(52) U.S. Cl.
CPC ............... *B60K 6/54* (2013.01); *B60K 6/547* (2013.01); *B60L 1/003* (2013.01); *B60L 3/0061* (2013.01); *B60L 3/04* (2013.01); *B60L 11/14* (2013.01); *B60L 11/18* (2013.01); *B60L 15/2054* (2013.01); *B60W 10/02* (2013.01); *B60W 10/04* (2013.01); *B60W 10/06* (2013.01); *B60W 10/08* (2013.01); *B60W 10/10* (2013.01); *B60W 10/101* (2013.01); *B60W 20/00* (2013.01); *B60W 50/029* (2013.01); *E02F 3/283* (2013.01); *E02F 9/02* (2013.01); *E02F 9/2217* (2013.01); *F16H 3/725* (2013.01); *F16H 61/0267* (2013.01); *B60K 1/02* (2013.01); *B60K 2006/381* (2013.01); *B60K 2006/4816* (2013.01); *B60L 2200/40* (2013.01); *B60L 2240/421* (2013.01); *F16H 3/724* (2013.01); *F16H 3/727* (2013.01); *F16H 2037/049* (2013.01); *Y02T 10/6239* (2013.01); *Y02T 10/645* (2013.01); *Y02T 10/70* (2013.01); *Y02T 10/7077* (2013.01); *Y02T 10/7275* (2013.01); *Y10S 903/91* (2013.01); *Y10S 903/919* (2013.01)

(56) References Cited

U.S. PATENT DOCUMENTS

| | | |
|---|---|---|
| 2009/0105028 A1 | 4/2009 | Hiraki et al. |
| 2009/0156359 A1* | 6/2009 | Tabata ............... F16H 61/0437 477/108 |
| 2013/0006489 A1 | 1/2013 | Kim |
| 2015/0046008 A1* | 2/2015 | Kuwamoto ........... B60K 6/445 701/22 |

FOREIGN PATENT DOCUMENTS

| | | |
|---|---|---|
| JP | 2006-329244 A | 12/2006 |
| WO | 2009/037996 A1 | 3/2009 |
| WO | 2013/140541 A1 | 9/2013 |

OTHER PUBLICATIONS

The extended European search report for the corresponding European application No. 15740285.0, dated Mar. 7, 2017.

* cited by examiner

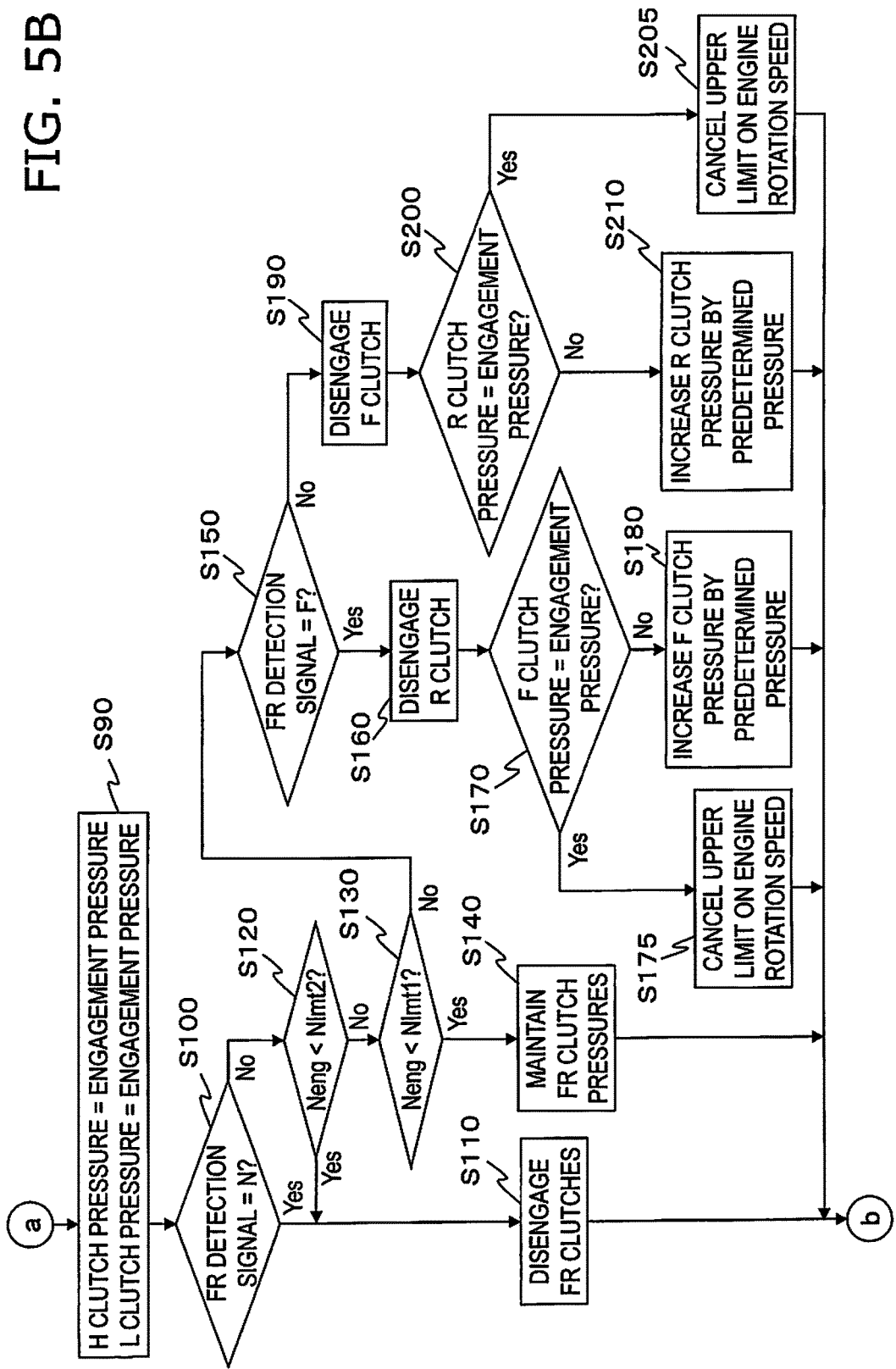

WORK VEHICLE AND WORK VEHICLE EMERGENCY TRAVELLING METHOD

CROSS-REFERENCE TO RELATED APPLICATIONS

This application is a U.S. National stage application of International Application No. PCT/JP2015/051260, filed on Jan. 19, 2015. This U.S. National stage application claims priority under 35 U.S.C. § 119(a) to Japanese Patent Application No. 2014-012023, filed in Japan on Jan. 27, 2014, the entire contents of which are hereby incorporated herein by reference.

BACKGROUND

Field of the Invention

The present invention relates to a work vehicle and a work vehicle emergency travelling method.

A work vehicle, which is provided with a power train (referred to below as a "torque converter transmission apparatus") which has a torque converter and a multiple step transmission apparatus, is well known as a work vehicle, such as a wheel loader. At the same time, HMT (hydraulic-mechanical transmission apparatuses) and EMT (electro-mechanical transmission apparatuses) are known in recent years as power trains which are in place of the torque converter transmission mechanism As shown in Japanese Unexamined Patent Application Publication No. 2006-329244, the HMT has a gear mechanism and a motor which is connected to the rotating elements of the gear mechanism, and the HMT transfers a portion of the drive force from an engine to a travelling apparatus by converting the drive force into hydraulic pressure and transfers the remaining portion of the drive force mechanically to the travelling apparatus.

The EMT is provided with, for example, a planetary gear mechanism and an electric motor so that stepless transmission is possible. Out of three elements of a sun gear, a carrier, and a ring gear in the planetary gear mechanism, a first element is joined with an input shaft and a second element is joined with an output shaft. In addition, a third element is joined with the electric motor. The electric motor functions as either a motor or a generator according to the circumstances involved in travelling of the work vehicle. In the EMT, the rotation speed ratio of the output shaft changes in a stepless manner due to changes in the rotation speed of the electric motor.

In addition, a hydraulic motor is used in the HMT instead of the electric motor in the EMT. The hydraulic motor functions as either a motor or a pump according to the circumstances involved in travelling of the work vehicle. In the same manner as the EMT, the rotation speed ratio of the output shaft with regard to the input shaft changes in a stepless manner in the HMT due to changes in the rotation speed of the hydraulic motor.

SUMMARY

In a hybrid work vehicle where the EMT described above, the HMT described above, or the like is mounted, it is not possible to control the speed ratio to be a target value when the motor is broken. Accordingly, travelling itself is difficult in hybrid work vehicles when the motor is broken. However, it is desirable that it is possible at least to move to a location where there is no effect on running of other work vehicles when an anomaly occurs in the motor during running of the motor.

The object of the present invention is to propose a work vehicle and a work vehicle emergency travelling method to be able to perform emergency travelling when an anomaly occurs in an internal device (in particular, a motor) in a hybrid work vehicle.

A work vehicle according to a first aspect of the present invention is provided with an engine, a hydraulic pump, a working implement, a travelling apparatus, a power train, and a controller. The hydraulic pump is driven by the engine. The working implement is driven using hydraulic oil discharged from the hydraulic pump. The travelling apparatus is driven by the engine. The power train is configured to transfer the drive force from the engine to the travelling apparatus. The controller is configured to control the power train. The power train includes an input shaft, an output shaft, a gear mechanism, a first motor, a second motor, a rotating shaft fixing section, a transmission section, and a variable transmission section. The gear mechanism is configured to transfer rotation of the input shaft to the output shaft. The gear mechanism includes a first planetary gear mechanism and a second planetary gear mechanism. The first planetary gear mechanism includes a first rotating element, a second rotating element, and a third rotating element which are different to each other. The second planetary gear mechanism includes a fourth rotating element, a fifth rotating element, and a sixth rotating element which are different to each other. The engine is connectable with the first rotating element via the input shaft. The transmission section is able to transfer the drive force of the second rotating element to the fourth rotating element. The rotating shaft fixing section is able to integrally operate the rotating shaft of the third rotating element and the rotating shaft of the fifth rotating element. The output shaft is connected with the sixth rotating element. The variable transmission section includes an input section where drive force is input and an output section configured to output drive force equal to or less than the input drive force. The controller includes an anomaly detection section, a connection modifying section, and a drive force conversion control section. The anomaly detection section is configured to detect if there is an anomaly in at least one of the motors out of the first motor and the second motor. The connection modifying section is configured to modify the connection relationships between the elements inside the power train to transfer the output of the engine to the output shaft without at least one of the motors being driven, by integrally operating the rotating shaft of the third rotating element and the rotating shaft of the fifth rotating element using at least the rotating shaft fixing section. The drive force conversion control section is configured to control the variable transmission section to enable the output of the engine to be converted to an appropriate drive force and the converted drive force to be transferred to the output shaft.

The rotating shaft fixing section may include an L clutch and an H clutch. The L clutch is connectable to a fixed end. The H clutch is connectable to the third rotating element and the fifth rotating element.

The connection modifying section may be configured to set both the L clutch and the H clutch to an engagement state.

The variable transmission section may include a first clutch that is one of an F clutch or an R clutch. The F clutch may be connected with the gear mechanism configured to drive the travelling apparatus in a forward direction. The R clutch may be connected with the gear mechanism configured to drive the travelling apparatus in a reverse direction. The drive force conversion control section may be configured to carry out control so that the clutch pressure in the first clutch is gradually increased when the work vehicle sets off.

The variable transmission section may include a second clutch that is one of the H clutch or the L clutch. The drive force conversion control section may be configured to carry out control so that the clutch pressure in the second clutch is gradually increased after engaging of a third clutch that is the other of the H clutch and the L clutch when the work vehicle sets off.

The controller may be configured to carry out control so that the rotation speed of the engine does not exceed a predetermined upper limit value when performing an operation of the connection modifying section or control by the drive force conversion control section.

The work vehicle may be further provided with an energy storage section configured to store energy generated by at least the second motor and configured to output the energy to at least the second motor. The variable transmission section may include a first clutch that is one of an F clutch or an R clutch. The F clutch is connected with the gear mechanism configured to drive the travelling apparatus in a forward direction. The R clutch is connected with the gear mechanism configured to drive the travelling apparatus in a reverse direction. The connection modifying section may set at least the L clutch to a disengagement state when the anomaly detection section detects an anomaly that the first motor is unable to rotate. Furthermore, the drive force conversion control section may be configured to carry out control so that the clutch pressure in the first clutch is increased, to cause the second motor to generate energy after the first clutch is engaged, and to cause the energy storage section to store the generated energy.

The connection modifying section may be configured to set the L clutch to a disengagement state and set the H clutch to an engagement state when the energy storage section stores energy equal to or more than a predetermined first amount. The drive force conversion control section may be configured to cancel the engaging of the first clutch and to drive the second motor using the energy stored in the energy storage section to drive the output shaft.

The drive force conversion control section may be configured to terminate driving of the second motor when the energy stored in the energy storage section is below a predetermined second amount smaller than the first amount. The connection modifying section may be configured to set the H clutch to a disengagement state. The drive force conversion control section may be configured to carry out control so that the clutch pressure in the first clutch is increased. Then, the drive force conversion control section may be configured to cause the second motor to generate energy from the drive force of the engine after engaging of the first clutch and to cause the energy storage section to store the generated energy.

When the energy stored in the energy storage section is equal to or more than a third amount smaller than the second amount, the drive force conversion control section may be configured to cause the second motor to rotate using energy stored in the energy storage section so that rotation of input and output rotating shafts of the first clutch are synchronized and subsequently to engage the first clutch. When the energy stored in the energy storage section is smaller than the third amount, the drive force conversion control section may be configured to carry out control so that the clutch pressure in the first clutch is gradually increased and subsequently to engage the first clutch.

A work vehicle control method according to a second aspect of the present invention is a method for controlling a work vehicle which is described below. The work vehicle includes an engine, a hydraulic pump, a working implement, a travelling apparatus, and a power train. The hydraulic pump is driven by the engine. The working implement is driven using hydraulic oil discharged from the hydraulic pump. The travelling apparatus is driven by the engine. The power train transfers the drive force from the engine to the travelling apparatus. The power train includes an input shaft, an output shaft, a gear mechanism, a first motor, a second motor, a rotating element connection section, a transmission section, and a variable transmission section. The rotation speed ratio of the output shaft with regard to the input shaft in the power train changes due to changes in the rotation speed of the first motor or the second motor. The gear mechanism is configured to transfer rotation of the input shaft to the output shaft. The gear mechanism includes a first planetary gear mechanism and a second planetary gear mechanism. The first planetary gear mechanism includes a first rotating element, a second rotating element, and a third rotating element which are different to each other. The second planetary gear mechanism includes a fourth rotating element, a fifth rotating element, and a sixth rotating element which are different to each other. The engine is connectable with the first rotating element via the input shaft. The transmission section is able to transfer drive force of the second rotating element to the fourth rotating element. The rotating shaft fixing section is able to integrally operate the rotating shaft of the third rotating element and the rotating shaft of the fifth rotating element. The output shaft is connected with the sixth rotating element. The variable transmission section includes an input section where drive force is input and an output section configured to output drive force equal to or less than the input drive force. The control method includes a first step, a second step, and a third step. The first step is the work vehicle detecting if there is an anomaly in at least one of the motors out of the first motor and the second motor. The second step is the work vehicle modifying the connection relationships between the elements inside the power train so as to transfer the output of the engine to the output shaft without at least one of the motors being driven, by integrally operating the rotating shaft of the third rotating element and the rotating shaft of the fifth rotating element using at least the rotating shaft fixing section. The third step is the work vehicle controlling the variable transmission section to enable the output of the engine to be converted to an appropriate drive force and the converted drive force to be transferred to the output shaft.

The rotating shaft fixing section may include an L clutch connectable to a fixed end and an H clutch connectable to the third rotating element and the fifth rotating element. In the step of the work vehicle modifying the connection relationships, the work vehicle may set both the L clutch and the H clutch to an engagement state.

The work vehicle may be further provided with an energy storage section which stores energy generated by at least the second motor and which is able to output the energy to at least the second motor. The rotating shaft fixing section may include an L clutch connectable to a fixed end and an H clutch connectable to the third rotating element and the fifth rotating element. The variable transmission section may include a first clutch that is one of an F clutch or an R clutch. The F clutch may be connected with the gear mechanism configured to drive the travelling apparatus in a forward direction. The R clutch may be connected with the gear mechanism configured to drive the travelling apparatus in a reverse direction. In the step of the work vehicle detecting if there is an anomaly in at least one of the motors, the work vehicle may detect an anomaly that the first motor is unable to rotate. In the step of the work vehicle controlling the variable transmission section, the work vehicle may set at least the L clutch to a disengagement state. In the step of the work vehicle controlling the variable transmission section, the work vehicle may carry out control so that the clutch pressure in the first clutch is increased. Furthermore, the work vehicle may cause the second motor to generate energy after the first clutch is engaged and cause the energy storage section to store the generated energy.

When the energy storage section stores the energy equal to or more than a predetermined first amount, in the step of the work vehicle modifying the connection relationships, the work vehicle may set the L clutch to a disengagement state and set the H clutch to an engagement state. In the step of the work vehicle controlling the variable transmission section, the work vehicle may cancel the engaging of the first clutch, drive the second motor using the energy stored in the energy storage section to drive the output shaft.

In the work vehicle and the work vehicle control method according to exemplary embodiments of the present invention, the connection relationships between the elements inside a power train are modified using a connection modifying section so that the drive force of an engine can be transferred to an output shaft without at least one motor being driven when it is detected that there is an anomaly in at least one of a first motor and a second motor. The speed ratio is fixed when the connection relationships are modified in this manner, but a variable transmission section is controlled using a drive force conversion control section so that the drive force from the engine can be converted to an appropriate drive force and the converted drive force can be transferred to the output shaft. Accordingly, it is possible to perform emergency travelling when an anomaly occurs in an internal device (in particular, a motor) in the work vehicle.

BRIEF DESCRIPTION OF THE DRAWINGS

FIG. 5B is a flow chart illustrating an outline of operations of the controller according to the first exemplary embodiment.

DESCRIPTION OF EXEMPLARY EMBODIMENTS

First Exemplary Embodiment

Figure 1:
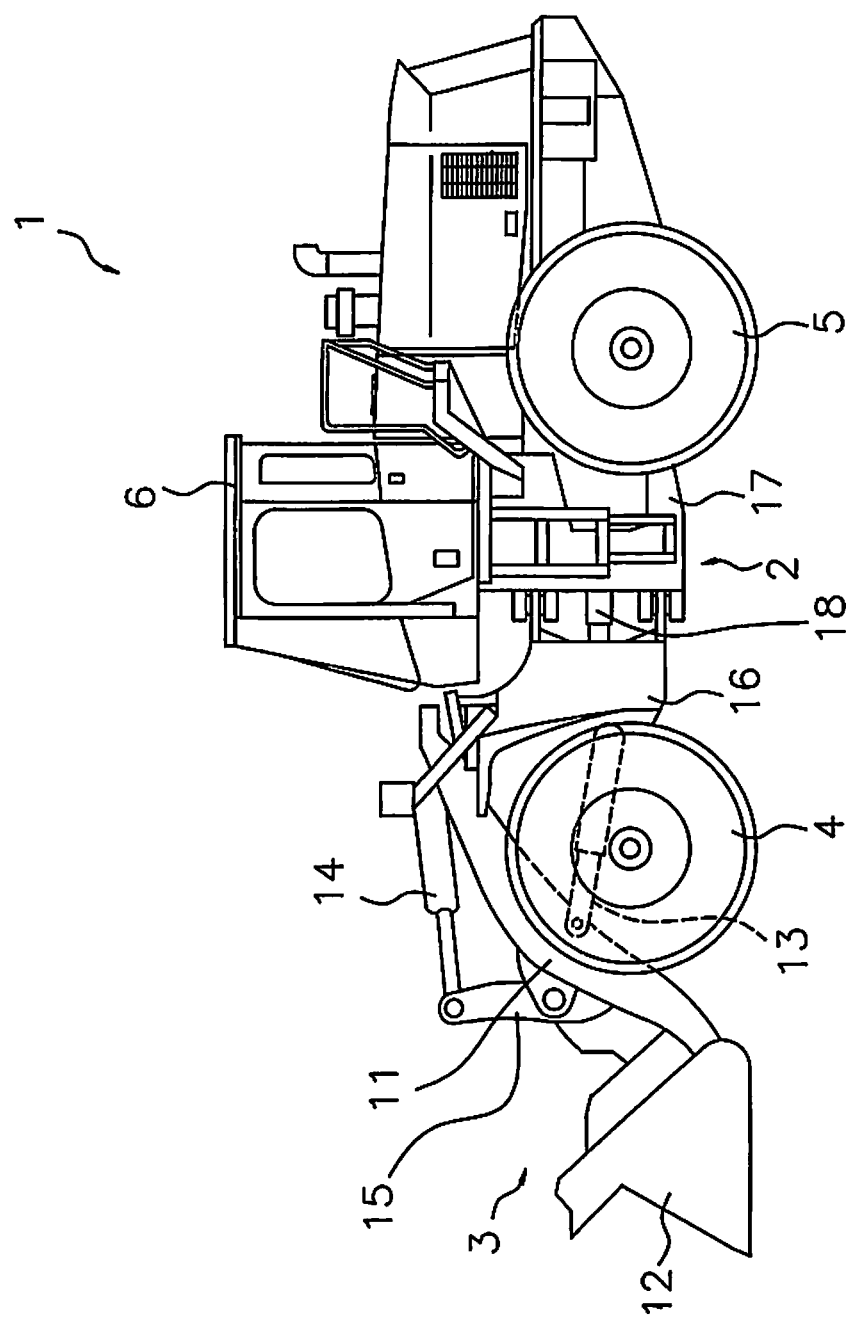
FIG. 1 is a side surface diagram of a work vehicle.

Exemplary embodiments of the present invention will be described below with reference to the drawings. FIG. 1 is a side surface diagram of a work vehicle 1 according to an exemplary embodiment of the present embodiment. The work vehicle 1 is provided with a vehicle frame 2, a working implement 3, travelling wheels 4 and 5, and a driving cab 6 as shown in FIG. 1. The work vehicle 1 is a wheel loader and is propelled to move due to the travelling wheels 4 and 5 being driven to rotate. It is possible for the work vehicle 1 to perform work such as digging using the working implement 3.

The vehicle frame 2 has a front frame 16 and a rear frame 17. The front frame 16 and the rear frame 17 are attached to be able to be tilted in the left and right direction with regard to each other. The working implement 3 and the travelling wheel 4 are attached to the front frame 16. The working implement 3 is driven using hydraulic oil from a working implement pump 23 (refer to FIG. 2) which will be described later. The working implement 3 has a boom 11 and a bucket 12. The boom 11 is mounted on the vehicle frame 2. The working implement 3 has a lift cylinder 13 and a bucket cylinder 14. The lift cylinder 13 and the bucket cylinder 14 are hydraulic cylinders. One end of the lift cylinder 13 is attached to the front frame 16. The other end of the lift cylinder 13 is attached to the boom 11. The boom 11 swings up and down by the lift cylinder 13 expanding and contracting due to hydraulic oil from the working implement pump 23. The bucket 12 is attached to the tip end of the boom 11. One end of the bucket cylinder 14 is attached to the vehicle frame 2. The other end of the bucket cylinder 14 is attached to the bucket 12 via a bell crank 15. The bucket 12 swings up and down by the bucket cylinder 14 expanding and contracting due to hydraulic oil from the working implement pump 23.

The driving cab 6 and the travelling wheel 5 are attached to the rear frame 17. The driving cab 6 is placed on the vehicle frame 2. A seat where an operator sits, a monitor which displays various types of states inside the work vehicle 1 to an operator, a regulating apparatus which will be described later, and the like are arranged inside the driving cab 6.

The work vehicle 1 has a steering cylinder 18. The steering cylinder 18 is attached to the front frame 16 and the rear frame 17. The steering cylinder 18 is a hydraulic cylinder. The progressing direction of the work vehicle 1 is modified to the left and right by the steering cylinder 18 expanding and contracting due to hydraulic oil from a steering pump 28 which will be described later.

Figure 2:
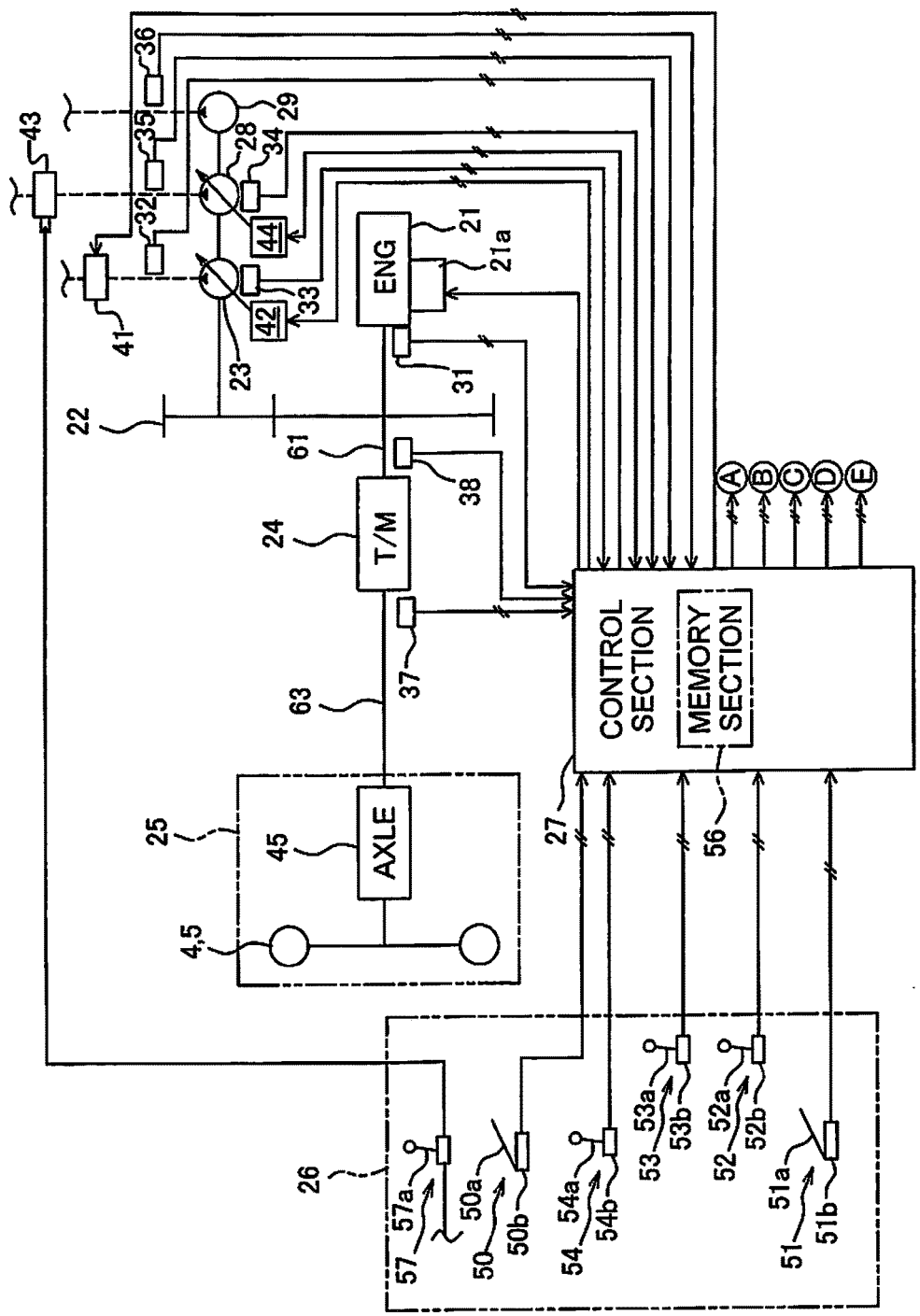
FIG. 2 is a schematic diagram illustrating the configuration of the work vehicle.

FIG. 2 is a schematic diagram illustrating the configuration of the work vehicle 1 according to an exemplary embodiment of the present invention. The work vehicle 1 is provided with an engine 21, a power take-off (PTO) 22, a power train 24, a travelling apparatus 25, a regulating apparatus 26, a controller 27, and the like as shown in FIG. 2.

The engine 21 is, for example, a diesel engine. The output of the engine 21 is controlled so that the amount of fuel and the amount of air which are injected into the inside of the cylinders of the engine 21 are adjusted. Adjusting of the amount of fuel is performed by the controller 27 controlling a fuel injection apparatus 21a which is attached to the engine 21. The work vehicle 1 is provided with an engine rotation speed detecting section 31. The engine rotation speed detecting section 31 detects the engine rotation speed and sends a detection signal which expresses the engine rotation speed to the controller 27.

The work vehicle 1 may have the working implement pump 23, the steering pump 28, and a transmission pump 29. The working implement pump 23, the steering pump 28, and the transmission pump 29 are hydraulic pumps. The PTO 22 transfers a portion of the drive force from the engine 21 to the hydraulic pumps 23, 28, and 29. That is, the PTO 22 distributes the drive force from the engine 21 to the hydraulic pumps 23, 28, and 29 and the power train 24.

The working implement pump 23 is driven using the drive force from the engine 21. Hydraulic oil which is discharged from the working implement pump 23 is supplied to the lift cylinder 13 and the bucket cylinder 14 described above via a working implement control valve 41. The work vehicle 1 is provided with a working implement pump pressure detecting section 32. The working implement pump pressure detecting section 32 detects the discharge pressure of hydraulic oil from the working implement pump 23 (referred to below as "working implement pump pressure") and sends a detection signal which expresses the working implement pump pressure to the controller 27.

The working implement pump 23 is a variable capacity type of hydraulic pump. The discharge capacity of the working implement pump 23 is modified due to modifications to the tilt angle of a swash plate or a swash shaft in the working implement pump 23. A first capacity control apparatus 42 is connected with the working implement pump 23. The first capacity control apparatus 42 is controlled by the controller 27 and modifies the tilt angle in the working implement pump 23. Due to this, the discharge capacity of the working implement pump 23 is controlled by the controller 27. For example, the first capacity control apparatus 42 adjusts the tilt angle in the working implement pump 23 so that the pressure differential before and after the working implement control valve 41 is constant. In addition, it is possible for the first capacity control apparatus 42 to arbitrarily modify the tilt angle in the working implement pump 23 according to command signals from the controller 27. In detail, the first capacity control apparatus 42 includes a first valve and a second valve which are not shown in the diagrams. When the hydraulic oil which is supplied to the working implement 3 is modified using the working implement control valve 41 described above, a pressure differential is generated between the discharge pressure in the working implement pump 23 and the pressure after passing through the working implement control valve 41 according to modifications in the opening of the working implement control valve 41. The first valve adjusts the tilt angle in the working implement pump 23 so that the pressure differential before and after the working implement control valve 41 is constant even when the load of the working implement 3 varies due to being controlled by the controller 27. In addition, it is possible for the second valve to further modify the tilt angle in the working implement pump 23 due to being controlled by the controller 27. The work vehicle 1 is provided with a first tilt angle detecting section 33. The first tilt angle detecting section 33 detects the tilt angle in the working implement pump 23 and sends a detection signal which expresses the tilt angle to the controller 27.

The steering pump 28 is driven using the drive force from the engine 21. Hydraulic oil which is discharged from the steering pump 28 is supplied to the steering cylinder 18 described above via a steering control valve 43. The work vehicle 1 is provided with a steering pump pressure detecting section 35. The steering pump pressure detecting section 35 detects the discharge pressure of hydraulic oil from the steering pump 28 (referred to below as "steering pump pressure") and sends a detection signal which expresses the steering pump pressure to the controller 27.

The steering pump 28 is a variable capacity type of hydraulic pump. The discharge capacity of the steering pump 28 is modified due to modifications to the tilt angle of a swash plate or a swash shaft in the steering pump 28. A second capacity control apparatus 44 is connected with the steering pump 28. The second capacity control apparatus 44 is controlled by the controller 27 and modifies the tilt angle in the steering pump 28. Due to this, the discharge capacity of the steering pump 28 is controlled by the controller 27. The work vehicle 1 is provided with a second tilt angle detecting section 34. The second tilt angle detecting section 34 detects the tilt angle in the steering pump 28 and sends a detection signal which expresses the tilt angle to the controller 27.

The transmission pump 29 is driven using the drive force from the engine 21. The transmission pump 29 is a fixed capacity type of hydraulic pump. Hydraulic oil which is discharged from the transmission pump 29 is supplied to clutches CF, CR, CL, and CH in the power train 24 via clutch control valves VF, VR, VL, and VH which will be described later. A transmission pump pressure detecting section 36 detects the discharge pressure of hydraulic oil from the transmission pump 29 (referred to below as "transmission pump pressure") and sends a detection signal which expresses the transmission pump pressure to the controller 27.

The PTO 22 transfers a portion of the drive force from the engine 21 to the power train 24. The power train 24 transfers the drive force from the engine 21 to the travelling apparatus 25. The power train 24 applies gearing and outputs the drive force from the engine 21. The configuration of the power train 24 will be described later in detail.

The travelling apparatus 25 has an axle 45 and the travelling wheels 4 and 5. The travelling apparatus 25 is driven by the engine 21. The axle 45 transfers the drive force from the power train 24 to the travelling wheels 4 and 5. Due to this, the travelling wheels 4 and 5 are rotated. The work vehicle 1 is provided with an output rotation speed detecting section 37 and an input rotation speed detecting section 38. The output rotation speed detecting section 37 detects the rotation speed of the output shaft 63 of the power train 24 (referred to below as "output rotation speed"). The output rotation speed detecting section 37 detects the vehicle speed of the travelling apparatus 25 by detecting the output rotation speed since the output rotation speed corresponds to the vehicle speed. The input rotation speed detecting section 38 detects the rotation speed of the input shaft 61 of the power train 24 (referred to below as "input rotation speed"). The output rotation speed detecting section 37 sends a detection signal which expresses the output rotation speed to the controller 27. The input rotation speed detecting section 38 sends a detection signal which expresses the input rotation speed to the controller 27.

Here, a rotation speed detecting section, which detects the rotation speed of rotating components in an inner section of the power train 24 and sends the rotation speed to the controller 27, may be provided separately instead of the output rotation speed detecting section 37 and the input rotation speed detecting section 38, and the controller 27 may calculate the output rotation speed and the input rotation speed from the rotation speed of these rotating components.

The regulating apparatus 26 is regulated by an operator. The regulating apparatus 26 has a brake regulating apparatus 50, an acceleration regulating apparatus 51, a working implement regulating apparatus 52, a forward and reverse switch regulating apparatus 54, and a steering regulating apparatus 57. Here, the regulating apparatus 26 may further have a transmission regulating apparatus 53 and a regulating member (which is not shown in the diagrams) for selecting an emergency travelling mode which will be described later.

The acceleration regulating apparatus 51 has an acceleration regulating member 51a and an acceleration regulation detecting section 51b. The acceleration regulating member 51a is regulated to set the target rotation speed for the engine 21. The acceleration regulation detecting section 51b detects the amount of regulating using the acceleration regulating member 51a (referred to below as "acceleration regulating amount"). The acceleration regulation detecting section 51b sends a detection signal which expresses the acceleration regulating amount to the controller 27.

The working implement regulating apparatus 52 has a working implement regulating member 52a and a working implement regulation detecting section 52b. The working implement regulating member 52a is regulated to operate the working implement 3. The working implement regulation detecting section 52b detects the position of the working implement regulating member 52a. The working implement regulation detecting section 52b outputs a detection signal which expresses the position of the working implement regulating member 52a to the controller 27.

The transmission regulating apparatus 53 has a transmission regulating member 53a and a transmission regulation detecting section 53b. It is possible for an operator to select a transmission pattern for the power train 24 by regulating the transmission regulating member 53a. The transmission regulation detecting section 53b detects the position of the transmission regulating member 53a. The transmission regulation detecting section 53b outputs a detection signal which expresses the position of the transmission regulating member 53a to the controller 27.

The forward and reverse switch regulating apparatus 54 has a forward and reverse switch regulating member 54a and a forward and reverse switch regulation detecting section 54b. In the description from here onwards, the forward and reverse switch regulating apparatus 54 is referred to as the FR regulating apparatus 54, the forward and reverse switch regulating member 54a is referred to as the FR regulating member 54a, and the forward and reverse switch regulation detecting section 54b is referred to as the FR regulation detecting section 54b. The FR regulating apparatus 54 is selectively switched between a forward position (F), a neutral position (N), and a reverse position (R). The FR regulation detecting section 54b detects the position of the FR regulating member 54a. The FR regulation detecting section 54b outputs a detection signal which expresses the position of the FR regulating member 54a (FR detection signal) to the controller 27.

The steering regulating apparatus 57 has a steering regulating member 57a. The steering regulating apparatus 57 drives the steering control valve 43 by supplying a pilot pressure to the steering control valve 43 based on regulating using the steering regulating member 57a. It is possible for an operator to modify the progressing direction of the work vehicle to the left and right by regulating the steering regulating member 57a. Here, the steering regulating apparatus 57 may drive the steering control valve 43 by regulating using the steering regulating member 57a being converted into electric signals.

The brake regulating apparatus 50 has a brake regulating member 50a and a brake regulation detecting section 50b. A stopping force is generated in the work vehicle 1 due to an operator operating the braking apparatus by regulating the brake regulating member 50a. The brake regulation detecting section 50b detects the position of the brake regulating member 50a. The braking regulation detecting section 50b outputs a detection signal which expresses the position of the brake regulating member 50a to the controller 27. The brake regulating member 50a includes a parking brake regulating member which is regulated to operate a parking brake PB which will be described later. The parking brake regulating member is, for example, a parking switch or a parking lever and is regulated by an operator. The parking brake PB drives a parking brake control valve VB by supplying a pilot pressure to the parking brake control valve VB based on regulating using the parking brake regulating member. The regulating signal is output to the controller 27 by regulating the parking brake regulating member.

The controller 27 has a computing apparatus, such as a CPU, and memory, such as RAM or ROM, and performs various types of processing in order to control the work vehicle 1. In addition, the controller 27 has a memory section 56. The memory section 56 stores various types of programs and data to control the work vehicle 1.

The controller 27 sends command signals which express a command throttle value to the fuel injection apparatus 21a so that the target rotation speed for the engine 21 is obtained according to the acceleration regulating amount. In addition, the controller 27 may send command signals which relate to fuel injection and the amount of air flow to the fuel injection apparatus 21a to output torque characteristics in the engine 21 according to the acceleration regulating amount. The controller 27 controls the hydraulic pressure which is supplied to the hydraulic cylinders 13 and 14 by controlling the working implement control valve 41 based on a detection signal from the working implement regulation detecting section 52b. Due to this, the working implement 3 is operated by the hydraulic cylinders 13 and 14 expanding and contracting.

Figure 3:
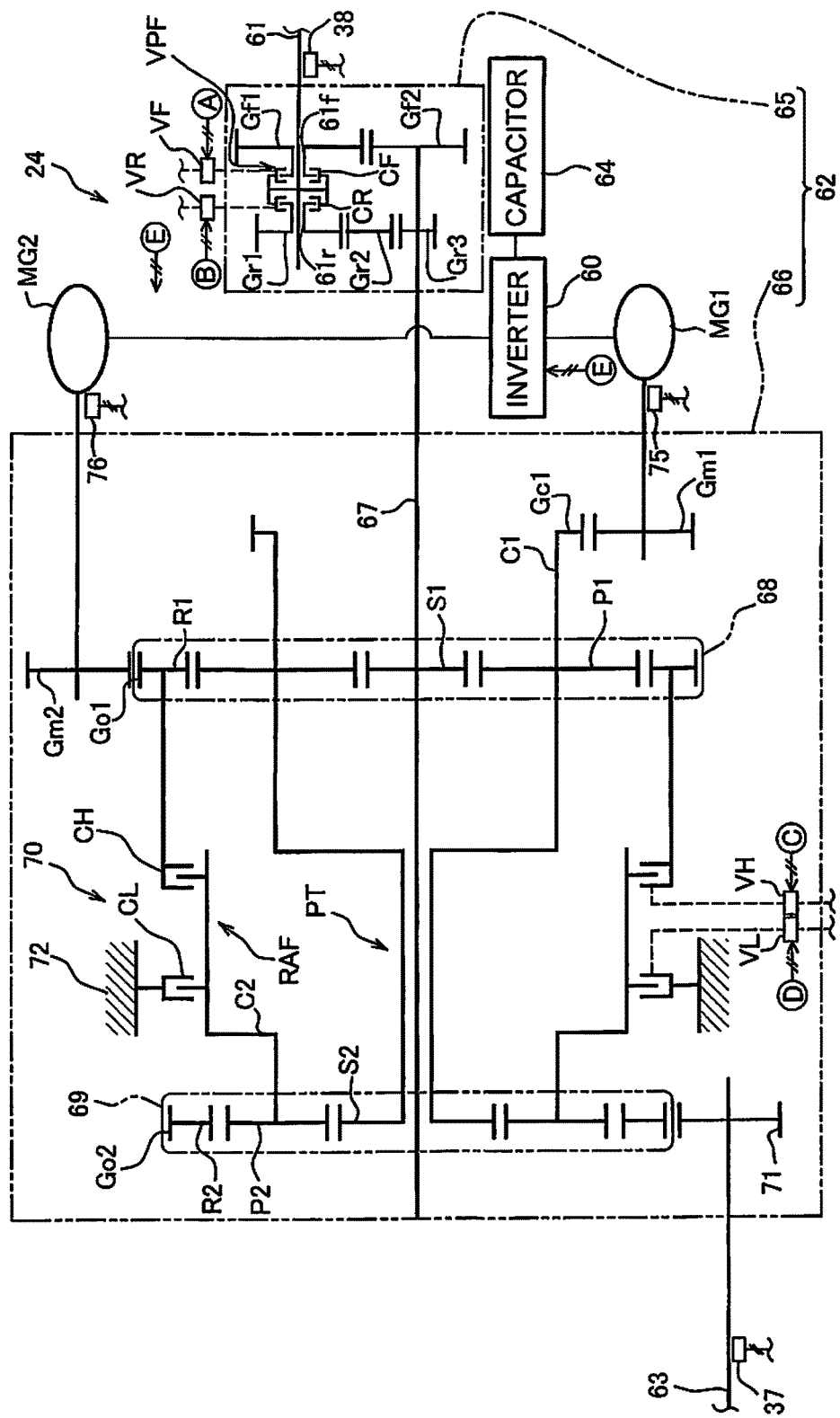
FIG. 3 is a schematic diagram illustrating the configuration of a power train according to an exemplary embodiment.

The configuration of the power train 24 will be described next in detail. FIG. 3 is a schematic diagram illustrating the configuration of the power train 24. The power train 24 is provided with an input shaft 61, a gear mechanism 62, an output shaft 63, a first motor MG1, a second motor MG2, an inverter 60, and a capacitor 64 as shown in FIG. 3. In the power train 24, the rotation speed ratio of the output shaft 63 with regard to the input shaft 61 changes due to changes in the rotation speed of the first motor MG1 or the second motor MG2. The input shaft 61 is connected with the PTO 22 described above. Rotation from the engine 21 is input to the input shaft 61 via the PTO 22. That is, the input shaft 61 is connected with the output shaft of the engine 21. The gear mechanism 62 transfers rotation of the input shaft 61 to the output shaft 63. The output shaft 63 is connected with the travelling apparatus 25 described above and transfers rotation from the gear mechanism 62 to the travelling apparatus 25 described above.

The gear mechanism 62 is a mechanism which transfers drive force from the engine 21. With the gear mechanism 62, the speed ratio of the output shaft 63 with regard to the input shaft 61 changes due to changes in the rotation speed of the first motor MG1 or the second motor MG2. The gear mechanism 62 has a FR switching mechanism 65 and a gearing mechanism 66.

The FR switching mechanism 65 is provided with an F clutch CF, an R clutch CR, an F clutch output shaft 61f, an R clutch output shaft 61r, a first F clutch gear Gf1, a second F clutch gear Gf2, a first R clutch gear Gr1, a second R clutch gear Gr2, and a third R clutch gear Gr3. The F clutch CF connects or disconnects the F clutch output shaft 61f and the input shaft 61 (the F clutch input shaft). The R clutch CR connects or disconnects the R clutch output shaft 61r and the input shaft 61 (the R clutch input shaft). The first F clutch gear Gf1 is connected with the F clutch output shaft 61f. The first R clutch gear Gr1 is connected with the R clutch output shaft 61r. The second F clutch gear Gf1 is joined with a transfer shaft 67 and meshes with the first F clutch gear Gf1. The third R clutch gear Gr3 is joined with the transfer shaft 67 and meshes with the second R clutch gear Gr2. The second R clutch gear Gr2 meshes with the first R clutch gear Gr1 and the third R clutch gear Gr3. The second F clutch gear Gf2 and the third R clutch gear Gr3 are connected with the output shaft of the second motor gear MG2 via the transfer shaft 67, a first sun gear S1, first planetary gears P1, a first ring gear R1, and a first ring outer gear Go1 which will be described later. That is, the F clutch output shaft 61f and the R clutch output shaft 61r are connected with the output shaft of the second motor gear MG2 via at least one of the rotating elements in a first planetary gear mechanism.

The first and second F clutch gears Gf1 and Gf2 and the first to third R clutch gears Gr1 to Gr3 which are shown in FIG. 3 are only one example and may be any configuration as long as the rotation direction of the transfer shaft 67 in a case of being connected with the F clutch CF and the rotation direction of the transfer shaft 67 in a case of being connected with the R clutch CF are opposite to each other.

The F clutch CF and the R clutch CR are hydraulic clutches and hydraulic oil from the transmission pump 29 is supplied to each of the clutches CF and CR. Hydraulic oil to the F clutch CF is controlled using the F clutch control valve VF. Hydraulic oil to the R clutch CR is controlled using the R clutch control valve VR. The pressure in the clutches (clutch pressures) of the F clutch CF and the R clutch CR respectively change by each of the clutch control valves VF and VR being regulated. The output shaft of the clutch is connected while slipping with regard to the input shaft of the clutch when the clutch pressure is weak. Then, the output shaft of the clutch is connected without slipping with regard to the input shaft of the clutch when the clutch pressure reaches a predetermined pressure (engagement pressure). In this manner, connecting of the output shaft of the clutch without slipping with regard to the input shaft of the clutch is referred to as the clutch engaging.

Each of the clutch control valves VF and VR are controlled using command signals from the controller 27. The rotation direction which is output from the FR switching mechanism 65 is switched by switching between the F clutch CF being on (engaging) or off (disengaging) and the R clutch CR being on (engaging) or off (disengaging). That is, the F clutch CF connects with the gear mechanism 62 (in detail, with the first F clutch gear Gf1) configured to drive the travelling apparatus 25 in a forward direction. The R clutch CR is connected with the gear mechanism 62 (in detail, with the first R clutch gear Gr1) configured to drive the travelling apparatus 25 in a reverse direction.

The gearing mechanism 66 has the transfer shaft 67, a first planetary gear mechanism 68, a second planetary gear mechanism 69, a Hi/Lo switching mechanism 70, and an output gear 71. The transfer shaft 67 is linked with the FR switching mechanism 65.

The first planetary gear mechanism 68 has the first sun gear S1, the plurality of first planetary gears P1, a first carrier C1 which supports the plurality of first planetary gears P1, and the first ring gear R1. The first sun gear S1 is linked with the transfer shaft 67. Here, for convenience of description, the rotating element in the first planetary gear mechanism 68 which is connected with the engine 21 via the input shaft 61 is referred to as a first rotating element. That is, it is possible for the engine 21 to connect with the first rotating element in the first planetary gear mechanism 68 via the input shaft 61. The plurality of first planetary gears P1 mesh with the first sun gear S1 and are supported by the first carrier C1 to be able to rotate. A first carrier gear Gc1 is provided on an outer circumference section of the first carrier C1. The first ring gear R1 meshes with the plurality of planetary gears P1 and is able to rotate. In addition, the first ring outer gear Go1 is provided on the outer circumference of the first ring gear R1. Here, a part which transfers the drive force of one rotating element in the first planetary gear mechanism 68 to the one rotating element in the second planetary gear mechanism 69 is referred to as a transmission section PT. In the present exemplary embodiment, the first carrier C1 is equivalent to the transmission section PT. Then, the rotating element in the first planetary gear mechanism 68 which is connected to the transmission section PT is referred to as a second rotating element. In the present exemplary embodiment, the first planetary gears P1 are equivalent to the second rotating element.

The second planetary gear mechanism 69 has a second sun gear S2, a plurality of second planetary gears P2, a second carrier C2 which supports the plurality of second planetary gears P2, and a second ring gear R2. The second sun gear S2 is linked with the first carrier C1. The plurality of second planetary gears P2 mesh with the second sun gear S2 and are supported by the second carrier C2 so as to be able to rotate. The second ring gear R2 meshes with the plurality of planetary gears P2 and is able to rotate. A second ring outer gear Go2 is provided on the outer circumference of the second ring gear R2. The second ring outer gear Go2 meshes with the output gear 71 and rotation from the second ring gear R2 is output to the output shaft 63 via the output gear 71. Here, the rotating element in the second planetary gear mechanism 69 which is connected to the transmission section PT is referred to as a fourth rotating element. That is, the second sun gear S2 is equivalent to the fourth rotating element. Accordingly, the transmission section PT transfers drive force of the second rotating element to the fourth rotating element. In addition, the rotating element in the second planetary gear mechanism 69 which is connected to the output shaft 63 is referred to as a sixth rotating element. That is, the second ring gear R2 is equivalent to the sixth rotating element.

The Hi/Lo switching mechanism 70 is a mechanism for switching a drive force transfer pathway in the power train 24 between a first mode and a second mode. In the present exemplary embodiment, the first mode is a Lo mode which is selected in a case where the speed ratio is low and the second mode is a Hi mode which is selected in a case where the speed ratio is high. The Hi/Lo switching mechanism 70 has an H clutch CH which is on during the Hi mode and an L clutch CL which is on during the Lo mode. The H clutch CH connects or disconnects the first ring gear R1 and the second carrier C2. In addition, the L clutch CL connects or disconnects the second carrier C2 and a fixed end 72 and blocks or permits rotation of the second carrier C2.

Each of the clutches CH and CL are hydraulic clutches and hydraulic oil from the transmission pump 29 is supplied respectively to each of the clutches CH and CL. Hydraulic oil to the H clutch CH is controlled using the H clutch control valve VH. Hydraulic oil to the L clutch CL is controlled using the L clutch control valve VL. The pressure in each of the clutches CH and CL respectively (clutch pressures) change by the clutch control valves VH and VL being regulated in the same manner as the F clutch CF and the R clutch CR. Each of the clutch control valves VH and VL are controlled using command signals from the controller 27.

When the H clutch CH is in an engagement state, the rotating shaft of one rotating element (the first ring gear R1) in the first planetary gear mechanism 68 and the rotating shaft of one rotating element (the second planetary gears P2) in the second planetary gear mechanism 69 integrally rotate. Furthermore, when the L clutch CL is in an engagement state (a state where the output shaft of the clutch is connected without slipping with regard to the input shaft of the clutch), the rotating shaft of the first ring gear R1 and the rotating shaft of the second carrier C2 and the second planetary gears P2 are fixed. A part which is able to integrally operate the rotating shaft of one rotating element in the first planetary gear mechanism 68 and the rotating shaft of one rotating element in the second planetary gear mechanism 69 in this manner is referred to as a rotating shaft fixing section RAF. In the exemplary embodiments of the present invention, the rotating shaft fixing section RAF includes the H clutch CH and the L clutch CL. Here, the rotating element in the first planetary gear mechanism 68 which is connected with the rotating shaft fixing section RAF is referred to as a third rotating element, and the rotating element in the second planetary gear mechanism 69 which is connected with the rotating shaft fixing section RAF is referred to as a fifth rotating element. In the present exemplary embodiment, the first ring gear R1 is equivalent to the third rotating element and the second planetary gears P2 are equivalent to the fifth rotating element. According to these definitions, it can be said that it is possible for the H clutch CH to connect or disconnect the third rotating element and the fifth rotating element. In addition, the first rotating element, the second rotating element, and the third rotating element are different to each other, and the fourth rotating element, the fifth rotating element, and the sixth rotating element are different to each other.

When the H clutch CH and the L clutch CL are both in states of being engaged, drive force from the engine 21 is transferred to the output shaft with a speed ratio which is fixed when the F clutch CF or the R clutch CR is connected. Here, whichever one of the F clutch CF and the R clutch CR is connected is referred to as a "first clutch." In this case, the first clutch is determined based on the FR detection signal. It is desirable that the first clutch be such that the output shaft 61f or 61r of the first clutch is connected while slipping with regard to the input shaft 61 of the clutch which is a target for connection due to the clutch pressure in the first clutch being gradually increased so that the engine 21 does not stop (stall) during connection. The first clutch includes an input shaft (referred to below as an input section) 61 which transfers drive force from the engine 21 and an output shaft (referred to below as an output section) 61f or 61r which outputs a portion of the drive force of the input shaft. A part, which includes the input section 61 where drive force is input and the output section 61f or 61r configured to output drive force which is equal to or less than the input drive force in this manner, is referred to as a variable transmission section VPF. In this case, the first clutch is equivalent to the variable transmission section VPF.

The F clutch CF is shown in the diagram in FIG. 3 as the variable transmission section VPF, but the variable transmission section VPF is not limited to being the F clutch CF. In the present embodiment, the variable transmission section VPF has the meaning of any one clutch out of the F clutch CF, the R clutch CR, the H clutch CH, and the L clutch CL. For example, the controller 27 may engage one of the H clutch CH and the L clutch CL (referred to below as a third clutch) and may connect the other of the H clutch CH and the L clutch CL (referred to below as a second clutch) while slipping after the F clutch CF or the R clutch CR is engaged based on the FR detection signal. In this case, the second clutch is equivalent to the variable transmission section VPF.

The first motor MG1 and the second motor MG2 function as drive motors which generate drive force using electric energy. In addition, the first motor MG1 and the second motor MG2 also function as generators which generate electric energy using drive force which is input. The first motor MG1 functions as a generator in a case where a command signal from the controller 27 is applied so that torque acts on the first motor MG1 in an opposite direction to the rotation direction. A first motor gear Gm1 is fixed to the output shaft of the first motor MG1 and the first motor gear Gm1 meshes with the first carrier gear Gc1. That is, the first motor MG1 is connected with the first carrier C1 of the first planetary gear mechanism 68.

The inverter 60 is connected with the first motor MG1 and a command signal for controlling the motor torque of the first motor MG1 is applied from the controller 27 to the inverter 60. The rotation speed of the first motor MG1 is detected using a first motor rotation detecting section 75. The first motor rotation detecting section 75 sends a detection signal which expresses the rotation speed of the first motor MG1 to the controller 27.

The second motor MG2 is configured in the same manner as the first motor MG1. A second motor gear Gm2 is fixed to the output shaft of the second motor MG2 and the second motor gear Gm2 meshes with the first ring outer gear Go1. That is, the second motor MG2 is connected with the first ring outer gear Go1 (that is, the first ring gear R1) in the first planetary gear mechanism 68.

It is possible for the first motor MG1 and the second motor MG2 to function as drive motors and for each of the first carrier C1 and the first ring outer gear Go1 (that is, the first ring gear R1) to be fixed when the rotation speed is controlled to be zero.

The inverter 60 is connected with the second motor MG2 and a command signal for controlling the motor torque of the second motor MG2 is applied from the controller 27 to the inverter 60. An integrated inverter, which is used in driving both the first motor MG1 and the second motor MG2, is given as an example of the inverter 60 in the present exemplary embodiment, but separate inverters may be used with regard to each of the first motor MG1 and the second motor MG2. The rotation speed of the second motor MG2 is detected using a second motor rotation detecting section 76. The second motor rotation detecting section 76 sends a detection signal which expresses the rotation speed of the second motor MG2 to the controller 27.

The capacitor 64 functions as an energy storage section which stores energy generated by at least one of the motors MG1 and MG2. That is, the capacitor 64 stores electrical power which is generated by each of the motors MG1 and MG2 when the total amount of power generated by each of the motors MG1 and MG2 is larger than the total amount of electrical power consumed by each of the motors MG1 and MG2. In addition, the capacitor 64 releases electrical power when the total amount of electrical power consumed by each of the motors MG1 and MG2 is larger than the total amount of power generated by each of the motors MG1 and MG2. That is, each of the motors MG1 and MG2 are driven using electrical power which is stored in the capacitor 64. Here, a battery may be used instead of the capacitor 64 as another power storage means. In addition, the capacitor 64 may be omitted in a case where it is possible for each of the motors MG1 and MG2 to be driven by power being generated by one of the motors MG1 and MG2 and power being supplied to the other of the motors MG1 and MG2.

The controller 27 typically applies a command signal, which expresses the command torque or the command rotation speed to the motors MG1 and MG2, to the inverter 60 by receiving a detection signal from the various types of detecting sections. In addition, the controller 27 typically applies command signals, which are for controlling the hydraulic pressure for the clutches out of the clutches CF, CR, CH, and CL, respectively to the clutch control valves VF, VR, VH, and VL. However, in particular, in a first exemplary embodiment, the work vehicle 1 is propelled to move in a state where the clutches CH and CL are engaged using the rotating shaft fixing section RAF and control of the motors MG1 and MG2 is stopped in a case where the controller 27 detects when there is an anomaly in at least one of the first motor MG1 and the second motor MG2. The aspect where the work vehicle 1 is propelled to move in this manner is referred to as an "emergency travelling mode". In the description from here onwards, the configuration and the operations of the controller 27 which are for realizing the "emergency travelling mode" will be described in detail.

Figure 4:
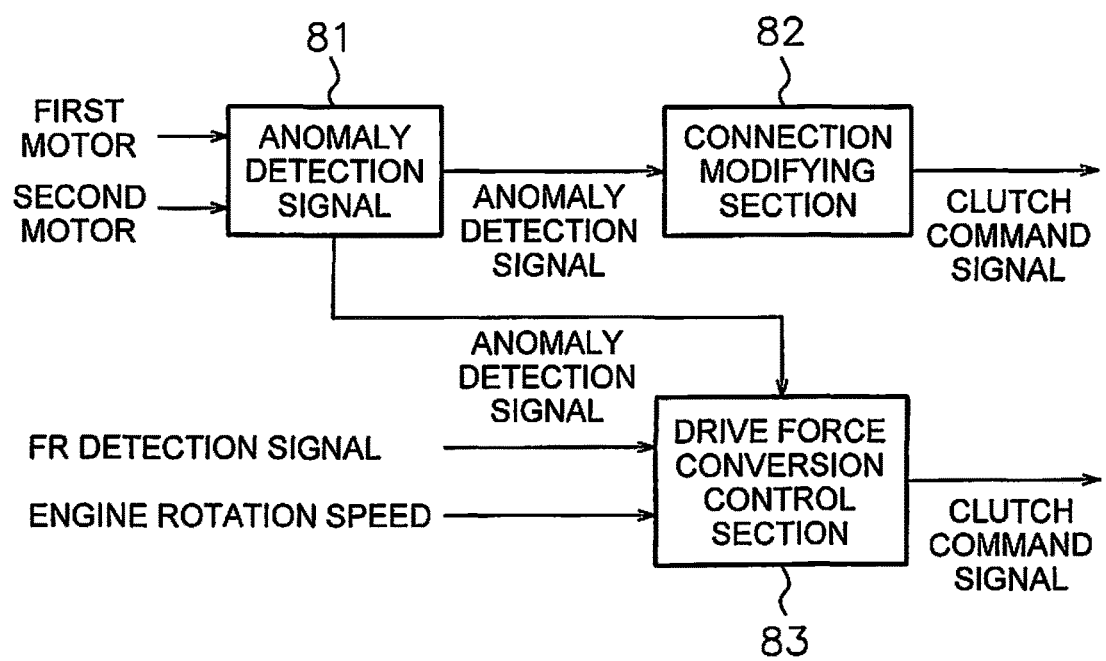
FIG. 4 is a diagram illustrating the internal configuration of a controller according to an exemplary embodiment.

FIG. 4 is a block diagram illustrating the details of an internal configuration of the controller 27 according to the present exemplary embodiment. The controller 27 further includes an anomaly detection section 81, a connection modifying section 82, and a drive force conversion control section 83 as shown in FIG. 4. Illustration of the memory section 56 is omitted in FIG. 4.

The anomaly detection section 81 detects anomalies which occur in at least one of the motors out of the first motor MG1 and the second motor MG2 based on current values, voltage values, or the like which are measured in various types of sensors (the first motor rotation speed detecting section 75, the second motor rotation speed detecting section 76, and the like), the inverter 60, and the capacitor 64 which are connected to the first motor MG1 and the second motor MG2. In particular, in the first exemplary embodiment, the anomaly detection section 81 detects anomalies where it is possible for at least one of the first motor MG1 and the second motor MG2 to rotate but without normal operation according to command signals from the controller 27. These anomalies are detected by detecting excess current occurring, due to short circuiting of a circuit, such as a coil in the motor, or an anomaly in contact occurring between a circuit in the motor and the outside, using current and the like which flows in the inverter 60. In addition, in a case where it is not possible for one of the first motor rotation speed detecting section 75 and the second motor rotation speed detecting section 76 to output a two-phase output signal, it is possible for the anomaly detection section 81 to detect anomalies in the motors which relate to the motor rotation speed detecting sections. The anomaly detection section 81 outputs an anomaly detection signal which includes information on the motor where an anomaly is detected to the connection modifying section 82 and the drive force conversion control section 83.

The connection modifying section 82 modifies the connection relationships between the elements inside the power train 24 so that it is possible for the output of the engine 21 to be transferred to the output shaft 63, even with driving of the motor where an anomaly is detected using the anomaly detection section 81, by integrally operating the rotating shaft of the third rotating element (the first ring gear R1) and the rotating shaft of the fifth rotating element (the second planetary gears P2) using at least the rotating shaft fixing section RAF. In detail, the connection modifying section 82 sets both the H clutch CH and the L clutch CL to an engagement state.

The drive force conversion control section 83 controls the variable transmission section VPF so that the output of the engine 21 can be converted to an appropriate drive force and the converted drive force can be transferred to the output shaft 63. In detail, the drive force conversion control section 83 determines which clutch out of the F clutch CF and the R clutch CR is the first clutch based on the FR switching signal in a case where the first clutch described above is the variable transmission section VPF and carries out control so that the clutch pressure in the first clutch is gradually increased when the work vehicle 1 sets off so that the engine 21 does not stop based on the engine rotation speed. The drive force conversion control section 83 engages either out of the F clutch CF or the R clutch CR based on the FR detection signal in a case where the second clutch described above is the variable transmission section VPF. Next, the drive force conversion control section 83 selects one of the H clutch CH or the L clutch CL as the second clutch and selects the other of the H clutch CH or the L clutch CL as the third clutch and engages the third clutch first. Lastly, the drive force conversion control section 83 carries out control so that the clutch pressure in the second clutch is gradually increased when the work vehicle 1 sets off so that the engine 21 does not stop based on the engine rotation speed. Here, the processing by the connection modifying section 82 and the processing by the drive force conversion control section 83 progress at the same time in a case where the second clutch described above is the variable transmission section VPF. Details on these operations will be described below.

Figure 5A:
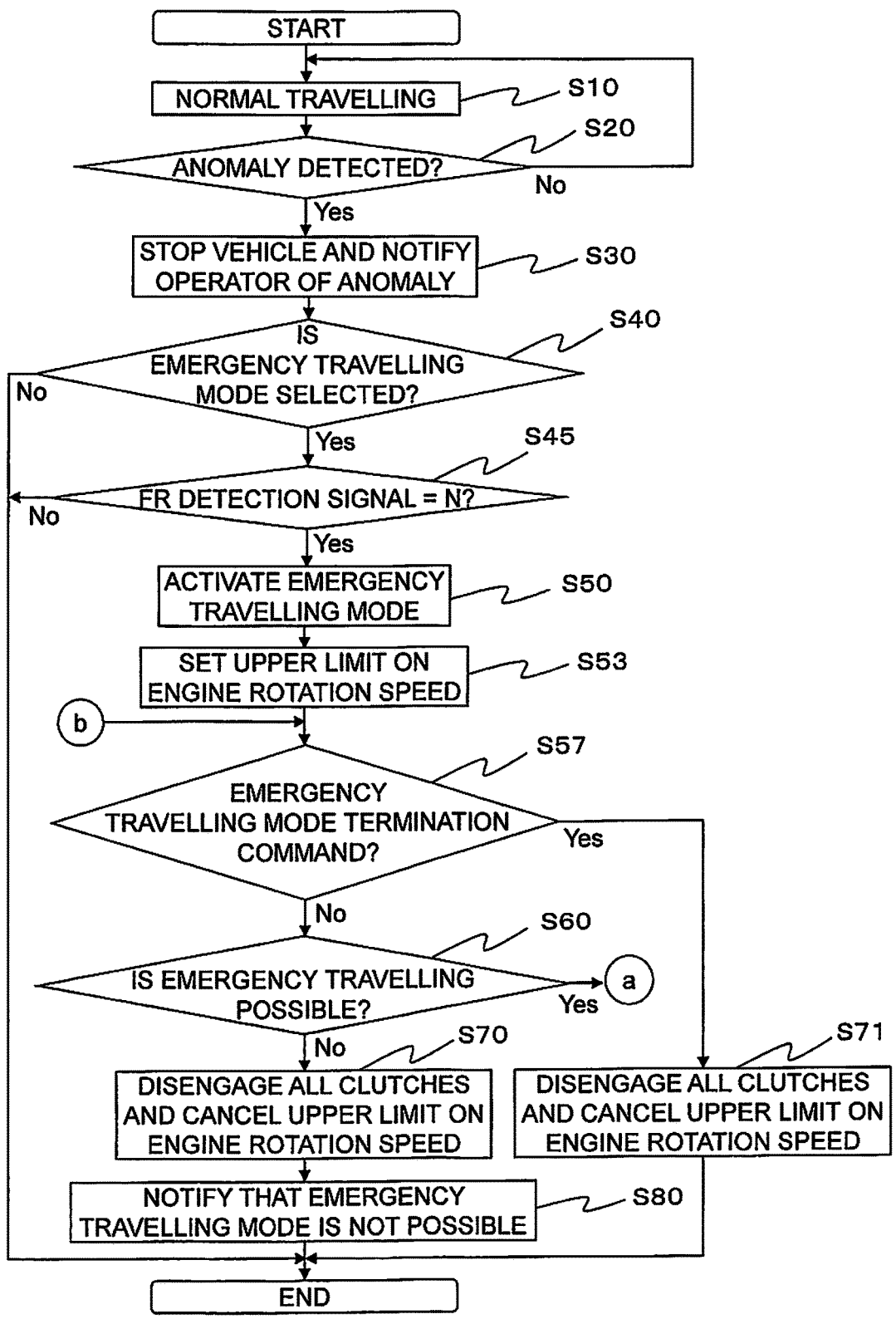
FIG. 5A is a flow chart illustrating an outline of operations of a controller according to a first exemplary embodiment.
Figure 5C:
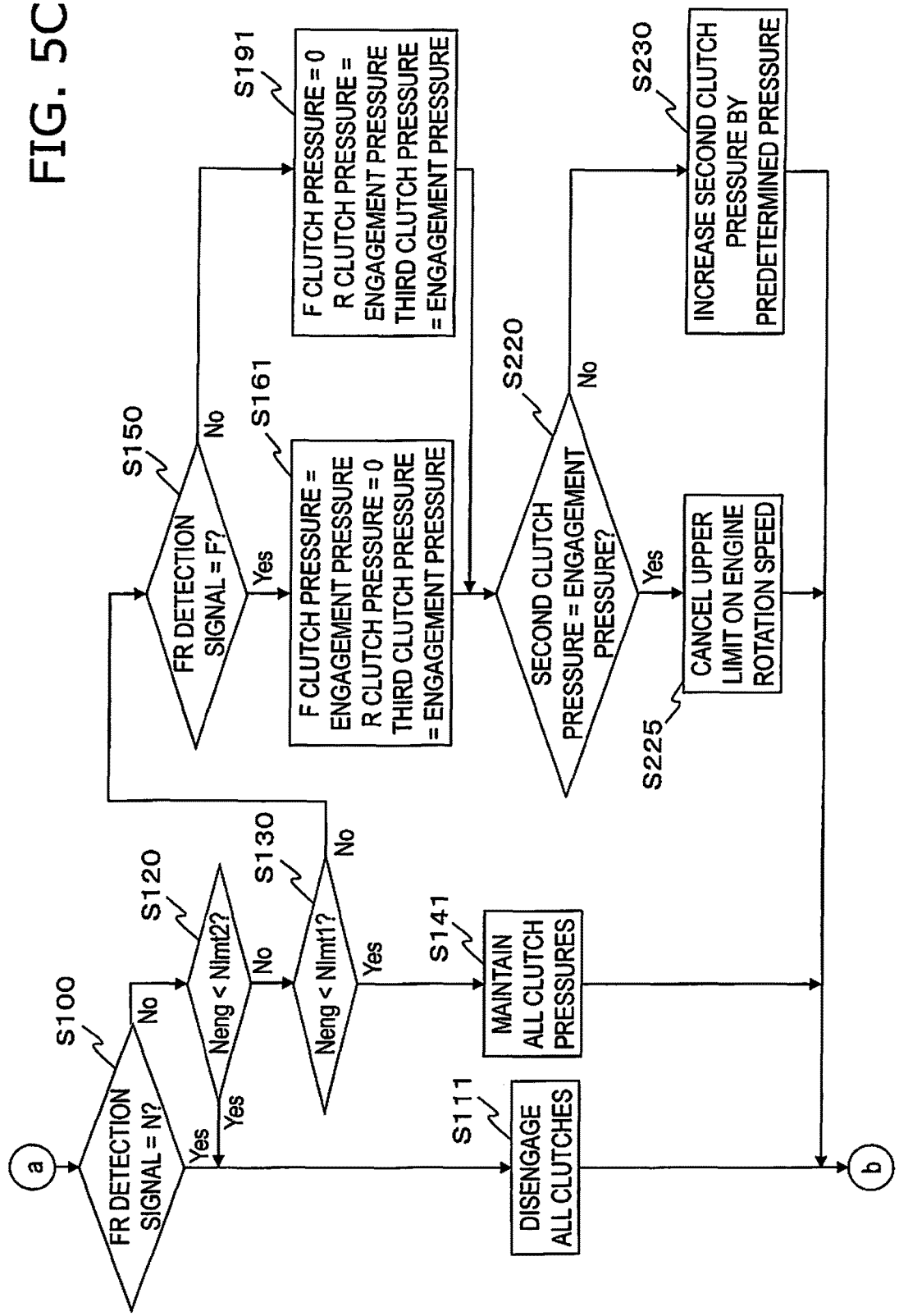
FIG. 5C is a flow chart illustrating an outline of operations of the controller according to the first exemplary embodiment.

FIGS. 5A to 5C are flow charts illustrating an outline of operations of the controller 27 according to the first exemplary embodiment. FIG. 5A illustrates common operations which are performed by the controller 27 in a case where the first clutch is the variable transmission section VPF and in a case where the second clutch is the variable transmission section VPF. FIG. 5B illustrates operations which are performed by the controller 27 in a case where the first clutch is the variable transmission section VPF. FIG. 5C illustrates operations which are performed by the controller 27 in a case where the second clutch is the variable transmission section VPF. Representations of the same operations are given the same reference numerals in FIG. 5B and FIG. 5C and detailed description is omitted.

When the work vehicle 1 is performing normal travelling (step S10) after activation of the work vehicle 1, the anomaly detection section 81 detects an anomaly which occurs in at least one of the motors out of the first motor MG1 and the second motor MG2 (YES in step S20). At this time, travelling of the work vehicle 1 is stopped and an operator is notified that there is an anomaly by displaying this on a monitor inside the driving cab 6 or the like (step S30). At this time, the controller 27 may stop controlling the first motor MG1 and the second motor MG2 and disengage all of the clutches. In addition, the notification to the operator may be through another notification means, such as an audio notification, rather than by displaying on a monitor. The work vehicle 1 continues with normal travelling (step S10) in a case where the anomaly detection section 81 does not detect an anomaly (NO in step S20).

When the operator is notified of an anomaly, the operator determines whether or not to select the emergency travelling mode (step S40). When the operator selects the emergency travelling mode (YES in step S40) by regulating a regulating member for selecting the emergency travelling mode, the controller 27 ascertains whether or not the FR detection signal is a signal which represents the neutral position (N) (step S45). In a case where the FR detection signal is a signal which represents the neutral position (N) (YES in step S45), the controller 27 activates the emergency travelling mode (step S50). In a case where the operator does not select the emergency travelling mode (NO in step S40) or in a case where the FR detection signal is a signal which represents a position other the neutral position (N) (NO in step S45), the work vehicle 1 stops as it is.

In a case where the emergency travelling mode is activated, the controller 27 carries out control so that the engine rotation speed does not exceed a predetermined upper limit value Nlmt3 (step S53). Due to this, the controller 27 carries out control so that the engine rotation speed does not exceed the predetermined upper limit value Nlmt3 due to step S53 during execution of steps S90 to S170, S190, S191, S200, S210, S220, and S230 which follow after this. Next, the controller 27 ascertains whether or not there is an emergency travelling mode termination command from the operator based on whether or not the regulating member for selecting the emergency travelling mode is returned to the state for during normal travelling or the like (step S57). When there is an emergency travelling mode termination command (YES in step S57), the controller 27 outputs a command signal which is for disengaging of all of the clutches to the control valves which correspond to each of the clutches and cancels limits on the engine rotation speed due to step S53 (step S71). Then, the work vehicle 1 is stopped.

When there is no emergency travelling mode termination command (NO in step S57), the controller 27 ascertains whether or not emergency travelling is possible (step S60). In detail, the controller 27 ascertains whether or not it is possible to operate all of the elements of the power train 24 which are necessary for travelling during the "emergency travelling mode". In the first exemplary embodiment, the controller 27 ascertains whether or not it is possible to operate the clutches CF, CR, CH, and CL. In a case where the controller 27 ascertains that emergency travelling is not possible (NO in step S60), the controller 27 outputs a command signal which disengages all of the clutches to the control valves which corresponds to each of the clutches and cancels limits on the engine rotation speed due to step S53 (step S70) and notifies the operator that travelling in the emergency travelling mode is not possible (step S80). Even in this case, it is possible to utilize various types of notification means such as monitor display, audio notification, and the like.

Next, operations which are performed by the controller 27 in a case where the first clutch is the variable transmission section VPF will be described. In a case where the controller 27 ascertains that emergency travelling is possible (YES in step S60), the connection modifying section 82 outputs a command signal, which is for setting the clutch pressure in the H clutch CH to an engagement pressure, to the H clutch control valve VH and outputs a command signal, which is for setting the clutch pressure in the L clutch CL to an engagement pressure, to the L clutch control valve VL (step S90 in FIG. 5B). Due to this, both the H clutch CH and the L clutch CL are engaged. Furthermore, the rotating shaft of the third rotating element (the first ring gear R1) in the first planetary gear mechanism 68 and the rotating shaft of the fifth rotating element (the second planetary gears P2) in the second planetary gear mechanism 69 are fixed.

Next, if the FR detection signal is a signal which represents the neutral position (N) (YES in step S100), the drive force conversion control section 83 outputs command signals for disengaging of the clutches CH and CL to the clutch control valves VH and VL (step S110) and executes the processing of step S57 again. If the FR detection signal is not a signal which represents the neutral position (N) (NO in step S100), processing of step S120 is executed.

In step S120, the drive force conversion control section 83 ascertains whether or not an engine rotation speed Neng is smaller than a predetermined rotation speed Nlmt2. A rotation speed which is smaller than the rotation speed Nlmt2 is a rotation speed where concerns that the rotation speed will fall to a rotation speed where the engine 21 stops (stalls) are high. When the engine rotation speed Neng is smaller than the predetermined rotation speed Nlmt2 (YES in step S120), the drive force conversion control section 83 outputs a command signal for disengaging the clutches CF and CR to the F clutch control valve VF and the R clutch control valve VR (step S110). Due to this, stalling of the engine is prevented. After this, processing of step S57 is executed again.

When the engine rotation speed Neng is equal to or more than the predetermined rotation speed Nlmt2 (NO in step S120), the drive force conversion control section 83 ascertains whether or not the engine rotation speed Neng is smaller than a predetermined rotation speed Nlmt1 (step S130). A rotation speed which is smaller than the rotation speed Nlmt1 is a rotation speed where the possibility of the engine rotation speed falling to the rotation speed Nlmt2 is high. When the engine rotation speed Neng is smaller than the predetermined rotation speed Nlmt1 (YES in step S130), the drive force conversion control section 83 outputs a command signal for maintaining the clutch pressure in the clutches CF and CR to the F clutch control valve VF and the R clutch control valve VR (step S140). After this, processing of step S57 is executed again.

When the engine rotation speed Neng is equal to or more than the predetermined rotation speed Nlmt1 (NO in step S130), the drive force conversion control section 83 ascertains whether or not the FR detection signal is a signal which represents the forward position (F) (step S150). In a case where the FR detection signal is a signal which represents the forward position (F) (YES in step S150), the drive force conversion control section 83 outputs a command signal for disengaging the R clutch CR to the R clutch control valve VR (step S160) and, until the clutch pressure in the F clutch CF reaches an engagement pressure (NO in step S170), increases the clutch pressure in the F clutch CF by a predetermined pressure (ΔP) (step S180). When the clutch pressure in the F clutch CF reaches an engagement pressure (YES in step S170), limits on the engine rotation speed due to step S53 are cancelled (step S175). When step S175 or step S180 is executed, the processing of step S57 is executed again.

In a case where the FR detection signal is a signal which represents the reverse position (R) (NO in step S150), the drive force conversion control section 83 outputs a command signal for disengaging the F clutch CF to the F clutch control valve VF (step S190) and, until the clutch pressure in the R clutch CR reaches an engagement pressure (NO in step S200), increases the clutch pressure in the R clutch CR by a predetermined pressure (ΔP) (step S210). When the clutch pressure in the R clutch CR reaches an engagement pressure (YES in step S200), limits on the engine rotation speed due to step S53 are cancelled (step S205). When step S205 or step S210 is executed, the processing of step S57 is executed again.

Next, operations which are performed by the controller 27 in a case where the second clutch is the variable transmission section VPF will be described. In a case where the controller 27 ascertains that emergency travelling is possible (YES in step S60), when the FR detection signal is a signal which represents the neutral position (N) (YES in step S100 in FIG. 5C), the drive force conversion control section 83 outputs a command signal for disengaging of all of the clutches to the clutch control valves which correspond to each of the clutches (step S111) and executes the processing of step S57 again. When the FR detection signal is not a signal which represents the neutral position (N) (NO in step S100), processing of step S120 is executed. When the engine rotation speed Neng is smaller than the predetermined rotation speed Nlmt2 (YES in step S120) with this relationship, the drive force conversion control section 83 outputs a command signal for disengaging of all of the clutches to the clutch control valves which correspond to each of the clutches (step S111).

In a case where the engine rotation speed Neng is equal to or more than the predetermined rotation speed Nlmt2 (NO in step S120) and the engine rotation speed Neng is smaller than the predetermined rotation speed Nlmt1 (YES in step S130), the drive force conversion control section 83 outputs a command signal for maintaining the clutch pressure in all of the clutches to the clutch control valves which correspond to each of the clutches (step S141). When the engine rotation speed Neng is equal to or more than the predetermined rotation speed Nlmt1 (NO in step S130), the drive force conversion control section 83 ascertains whether or not the FR detection signal is a signal which represents the forward position (F) (step S150). In a case where the FR detection signal is a signal which represents the forward position (F) (YES in step S150), the drive force conversion control section 83 outputs a command signal for engaging the F clutch CF, a command signal for disengaging the R clutch CR, and a command signal for engaging the third clutch (either the H clutch CH or the L clutch CL) to the clutch control valves which correspond to each of the clutches (step S161). In a case where the FR detection signal is a signal which represents the reverse position (R) (NO in step S150), the drive force conversion control section 83 and the connection modifying section 82 outputs a command signal for disengaging the F clutch CF, a command signal for engaging the R clutch CR, and a command signal for engaging the third clutch (either the H clutch CH or the L clutch CL) to the clutch control valves which correspond to each of the clutches (step S191).

When step S161 or step S191 is completed, until the clutch pressure in the second clutch (the clutch out of the H clutch CH and the L clutch CL which is not the third clutch) reaches an engagement pressure (NO in step S220), the drive force conversion control section 83 and the connection modifying section 82 increase the clutch pressure in the second clutch by a predetermined pressure (ΔP) (step S230). When the clutch pressure in the second clutch reaches an engagement pressure (YES in step S220), limits on the engine rotation speed due to step S53 are cancelled (step S225). When step S111, S141, S225, or S230 is executed, the processing of step S57 is executed again.

The predetermined pressure ΔP and thresholds Nlmt1, Nlmt2, and Nlmt3 for the engine rotation speed described above are set in advance and are stored in the memory section 56. Here, Nlmt2<Nlmt1<Nlmt3. Here, which out of the H clutch CH and the L clutch CL is the second clutch and the third clutch described above is arbitrary. That is, the H clutch CH may be the second clutch and the L clutch CL may be the third clutch. Alternatively, the H clutch CH may be the third clutch and the L clutch CL may be the second clutch.

Here, step S90 and steps S161 and S191 described above are equivalent to the step of the work vehicle 1 modifying the connection relationships between the elements inside the power train 24 so that it is possible for the output of the engine 21 to be transferred to the output shaft 63 without at least one of the motors being driven by integrally operating the rotating shaft of the third rotating element (the first ring gear R1) and the rotating shaft of the fifth rotating element (the second planetary gear P2) using at least the rotating shaft fixing section RAF. In addition, steps S170 to S180, S200 to S210, and S220 to S230 are equivalent to the steps of the work vehicle 1 controlling the variable transmission section VPF so that the output of the engine 21 can be converted to an appropriate drive force and the converted drive force can be transferred to the output shaft 63.

In addition, the engine 21 changes the engine rotation speed Neng and the output torque in steps S90 to S230 and S60 according to the acceleration regulating amount. In a state where an operator is not pressing on the accelerator, the engine rotation speed Neng is maintained at a rotation speed for idling. Then, in a state where there is no load, the engine rotation speed Neng becomes larger as the acceleration regulating amount due to the operator becomes larger. In the emergency travelling mode, deceleration torque due to resistance from the road surface and the like is received by the rotating shaft of the engine 21 when the first clutch and the second clutch are connected, and the engine rotation speed Neng falls when the deceleration torque is higher than the engine output torque. In step S120 and step S130, the drive force conversion control section 83 ascertains whether or not the threat of the engine stopping is higher due to the fall in the engine rotation speed in this manner and performs suspension of increases in the clutch pressure or perform lowering of the clutch pressure according to requirements.

Second Exemplary Embodiment

The first exemplary embodiment describes emergency travelling in a case where it is not possible to control at least one of the first motor MG1 and the second motor MG2 and it is possible for both the first motor MG1 and the second motor MG2 to rotate. However, there are also anomalies due to seizing of the motor where the motor output shaft becomes fused together with the shaft holding bearings and is not able to move. This occurs due to the motor shaft and the shaft holder becoming one due to bearing being burnt together with the motor shaft and the shaft holder when lubricating oil is lacking in the shaft holder, the bearings which become burnt being melted, and the melted bearings being cooled. In particular, the second exemplary embodiment describes an emergency travelling method in a case where there is an anomaly where there is seizing of the first motor MG1.

The configuration of the work vehicle and the power train in the second exemplary embodiment is the same as in the first exemplary embodiment which is shown in FIG. 2 and FIG. 3. However, in particular, in the second exemplary embodiment, the capacitor 64 functions as an energy storage section which stores energy generated by at least the second motor MG2. That is, the electrical power which is generated by the second motor MG2 is stored in the capacitor 64. In addition, it is possible for the capacitor 64 to output electrical power which is stored in the capacitor 64 to at least the second motor MG2. Here, a battery may be used instead of the capacitor 64 as another power storage means. In addition, the variable transmission section VPF is the first clutch described above in the second exemplary embodiment.

The configuration of the controller 27 in the second exemplary embodiment includes the anomaly detection section 81, the connection modifying section 82, and the drive force conversion control section 83 as shown in FIG. 4. However, the detailed operations of each section in the anomaly detection section 81, the connection modifying section 82, and the drive force conversion control section 83 are different to the first exemplary embodiment.

The anomaly detection section 81 detects anomalies which occur in at least one of the motors out of the first motor MG1 and the second motor MG2. In particular, in the second exemplary embodiment, the anomaly detection section 81 detects whether or not there is seizing of the first motor MG1. That is, the anomaly detection section 81 detects anomalies where it is not possible for the first motor MG1 to rotate. In detail, the anomaly detection section 81 executes this operation due to an operator activating a first motor seizure check mode. When the first motor seizure check mode is activated, the anomaly detection section 81 disengages all of the clutches. Then, the anomaly detection section 81 obtains a rotation speed Nm1 of the first motor MG1 which is detected using the first motor rotation speed detecting section 75 by applying torque to the first motor MG1. The anomaly detection section 81 ascertains that there is an anomaly that the first motor MG1 is unable to rotate when a state, where the absolute value of the rotation speed |Nm1| is equal to or less than a predetermined threshold Nbond (here, Nbond>0), continues for a time period which is equal to or more than a predetermined time period Tbond.

The anomaly detection section 81 obtains a rotation speed Nm2 of the second motor MG2 which is detected using the second motor rotation speed detecting section 76 by also applying torque in the same manner to the second motor MG2. It is confirmed that a state, where the absolute value of the rotation speed |Nm2| is equal to or less than the predetermined threshold Nbond, does not continue for a time period which is equal to or more than the predetermined time period Tbond. That is, the anomaly detection section 81 confirms that there is no anomaly that the first motor MG1 is unable to rotate. In addition, the anomaly detection section 81 confirms disengaging or normally operation of the L clutch CL and normal operation of the inverter 60, the capacitor 64, the H clutch CH, and the first clutch described above which are connected with the second motor MG2.

The anomaly detection section 81 outputs an anomaly detection signal, which includes information on the motors when detecting seizing of the first motor MG1, no seizing of the second motor MG2, normal operation of each of the clutches, and the like, to the connection modifying section 82 and the drive force conversion control section 83. The connection modifying section 82 and the drive force conversion control section 83 perform the following operations when such an anomaly detection signal is received.

First, the connection modifying section 82 detects whether or not the capacitor 64 is charged with electric energy which is equal to or more than a predetermined full charge ascertaining threshold Vchg_f. The full charge ascertaining threshold Vchg_f is a value in the vicinity of the maximum charging amount for electric energy in the capacitor 64. Furthermore, Vchg_f is a charging amount to the extent such that travelling of the work vehicle 1 is not impeded. The connection modifying section 82 sets at least the L clutch CL to a disengagement state in a case where the capacitor 64 is not charged with electric energy which is equal to or more than the full charge ascertaining threshold Vchg_f. Normally, the connection modifying section 82 sets both the H clutch CH and the L clutch CL to a disengagement state. The connection modifying section 82 sets the H clutch CH to an engagement state and the L clutch CL to a disengagement state in a case where the capacitor 64 is charged with electric energy which is equal to or more than the full charge ascertaining threshold Vchg_f.

The drive force conversion control section 83 controls the variable transmission section VPF (the first clutch) so that it is possible for the output of the engine 21 to be transferred to the rotating shaft of the second motor MG2 when the H clutch CH and the L clutch CL are both in a disengagement state due to the connection modifying section 82. In detail, the drive force conversion control section 83 carries out control so that the clutch pressure in the first clutch is increased based on the engine rotation speed so that the engine 21 does not stop. Due to this, the first clutch is engaged. After the first clutch is engaged, the drive force conversion control section 83 generates electric energy in the second motor MG2 by increasing the rotation speed of the engine 21 or the like. The generated electric energy is stored in the capacitor 64.

The drive force conversion control section 83 cancels the engaging of the first clutch when the H clutch CH is set to an engagement state and the L clutch CL is set to a disengagement state by the connection modifying section 82. At this time, the clutch out of the F clutch CF and the R clutch CR which is not the first clutch is also disengaged. Then, the drive force conversion control section 83 drives the second motor MG2 by using energy stored in the capacitor 64 to drive the output shaft 63.

Next, details of the operations of the controller 27 in the second exemplary embodiment will be described. FIGS. 6A to 6D are flow charts illustrating an outline of operations of the controller 27 according to the second exemplary embodiment. When the work vehicle 1 is performing normal travelling (step S10) after activation of the work vehicle 1, anomalies with travelling of the work vehicle 1, such as not progressing even when an operator presses the accelerator, is confirmed by an operator. At this time, the operator activates the first motor seizure check mode (step S16). Next, the anomaly detection section 81 detects whether or not it is not possible for the first motor MG1 to rotate (step S22).

In step S22, the anomaly detection section 81 obtains the rotation speed Nm1 of the first motor MG1 which is detected using the first motor rotation speed detecting section 75 by applying torque to the first motor MG1. Then, the anomaly detection section 81 ascertains that there is an anomaly where rotation is not possible due to seizure of the first motor MG1 when a state, where the absolute value of the rotation speed |Nm1| which is obtained is equal to or less than the predetermined threshold Nbond, continues for a time period which is equal to or more than the predetermined time period Tbond. In a case where it is not possible for the first motor MG1 to rotate (NO in step S22), the flow returns to step S10. In a case where it is not possible for the first motor MG1 to rotate (YES in step S22), the flow proceeds to step S310.

In step S310, the controller 27 (the connection modifying section 82) ascertains whether or not a voltage Vcap in the capacitor 64 is lower than the full charge ascertaining threshold Vchg_f. In a case where the capacitor voltage Vcap is equal to or more than the full charge ascertaining threshold Vchg_f (NO in step S310), the controller 27 (the connection modifying section 82) proceeds to step S550 which will be described later (refer to FIG. 6A and FIG. 6D). Here, the full charge ascertaining threshold Vchg_f is a value in the vicinity of the maximum charging amount for electric energy in the capacitor 64.

In a case where the capacitor voltage Vcap is lower than the full charge ascertaining threshold Vchg_f (YES in step S310), the controller 27 (the connection modifying section 82) ascertains whether or not the F clutch CF and the R clutch CR are both released (disengaged) (step S320). In a case where either the F clutch CF or the R clutch CR are connected (NO in step S320), the controller 27 terminates this control since charging is not possible (refer to FIG. 6A and FIG. 6D). In a case where the F clutch CF and the R clutch CR are both disengaged (YES in step S320), the controller 27 (the connection modifying section 82) controls the first motor MG1 so that the rotation speed of the first motor MG1 is zero rpm (step S330). Normal rotation does not occur due to seizure of the rotating shaft of the first motor MG1, and this control is performed in order that the rotating shaft of the first motor MG1 is reliably set so as not to rotate in the following processes. Due to this, the rotating shaft of the second rotating element (the first planetary gears P1) and the rotating shaft of the fourth rotating element (the second sun gear S2) are fixed.

Next, in step S340, the controller 27 (the connection modifying section 82) controls the L clutch control valve VL so that at least the L clutch CL is in a disengagement state. Normally, the controller 27 (the connection modifying section 82) controls the H clutch control valve VH and the L clutch control valve VL so that the H clutch CH and the L clutch CL are both disengaged. That is, the controller 27 (the connection modifying section 82) outputs a command signal for disengaging both the H clutch CH and the L clutch CL to the H clutch control valve VH and the L clutch control valve VL. Due to this, the work vehicle 1 performs the same operation as the typical vehicle operation in neutral since it is possible for the output shaft 63 to freely rotate. That is, when the operation of step S340 is executed in a case where the work vehicle 1 is in a travelling state, the work vehicle 1 performs travelling due to inertia. In addition, when the work vehicle 1 is positioned on an inclined surface, the work vehicle 1 accelerates in a direction of going down the inclined surface when the component of gravity in a direction which is parallel to the inclined surface is larger than the frictional force in inner sections of the work vehicle 1 such as in the power train 24.

Figure 6A:
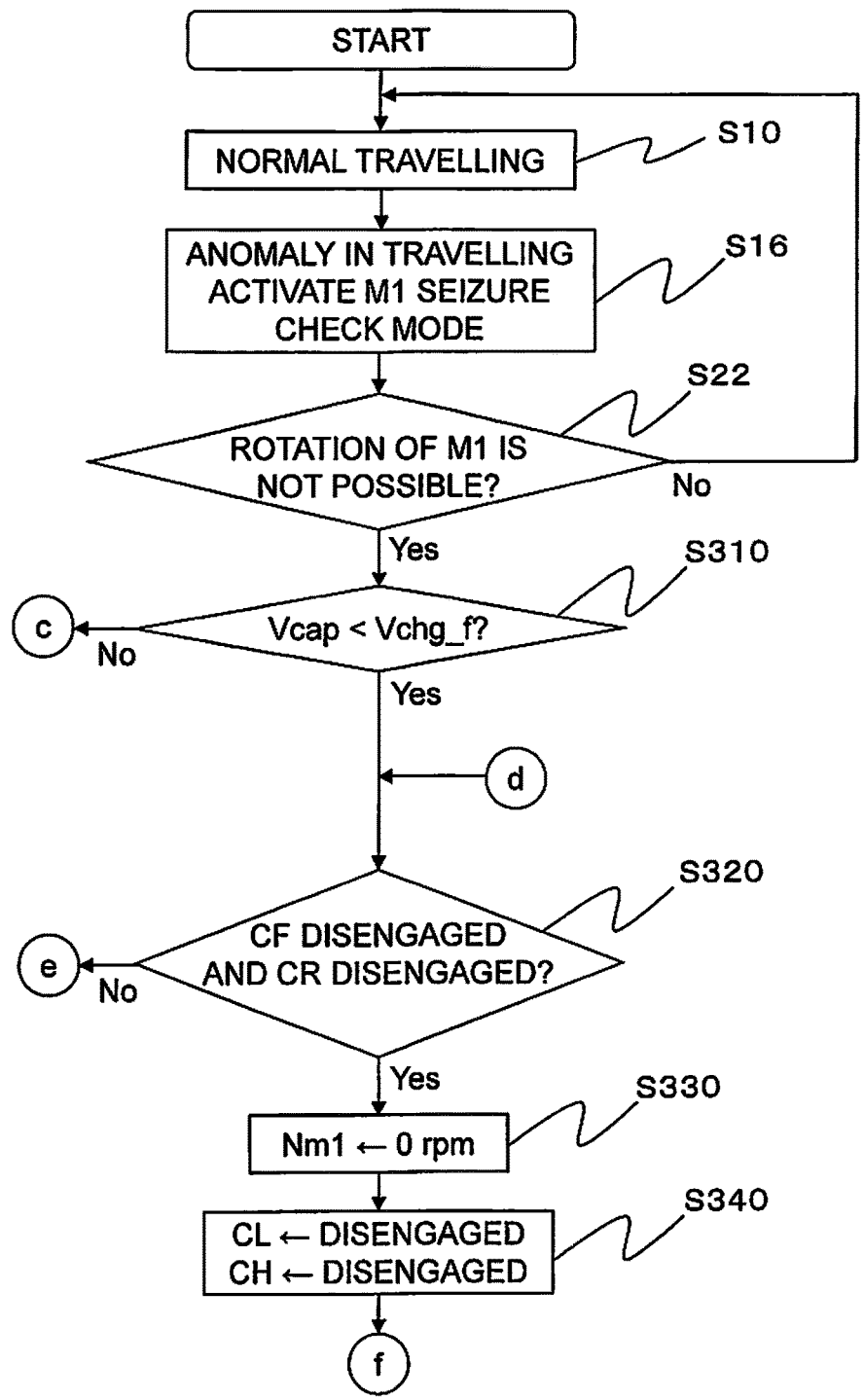
FIG. 6A is a flow chart illustrating an outline of operations of a controller according to a second exemplary embodiment.
Figure 6B:
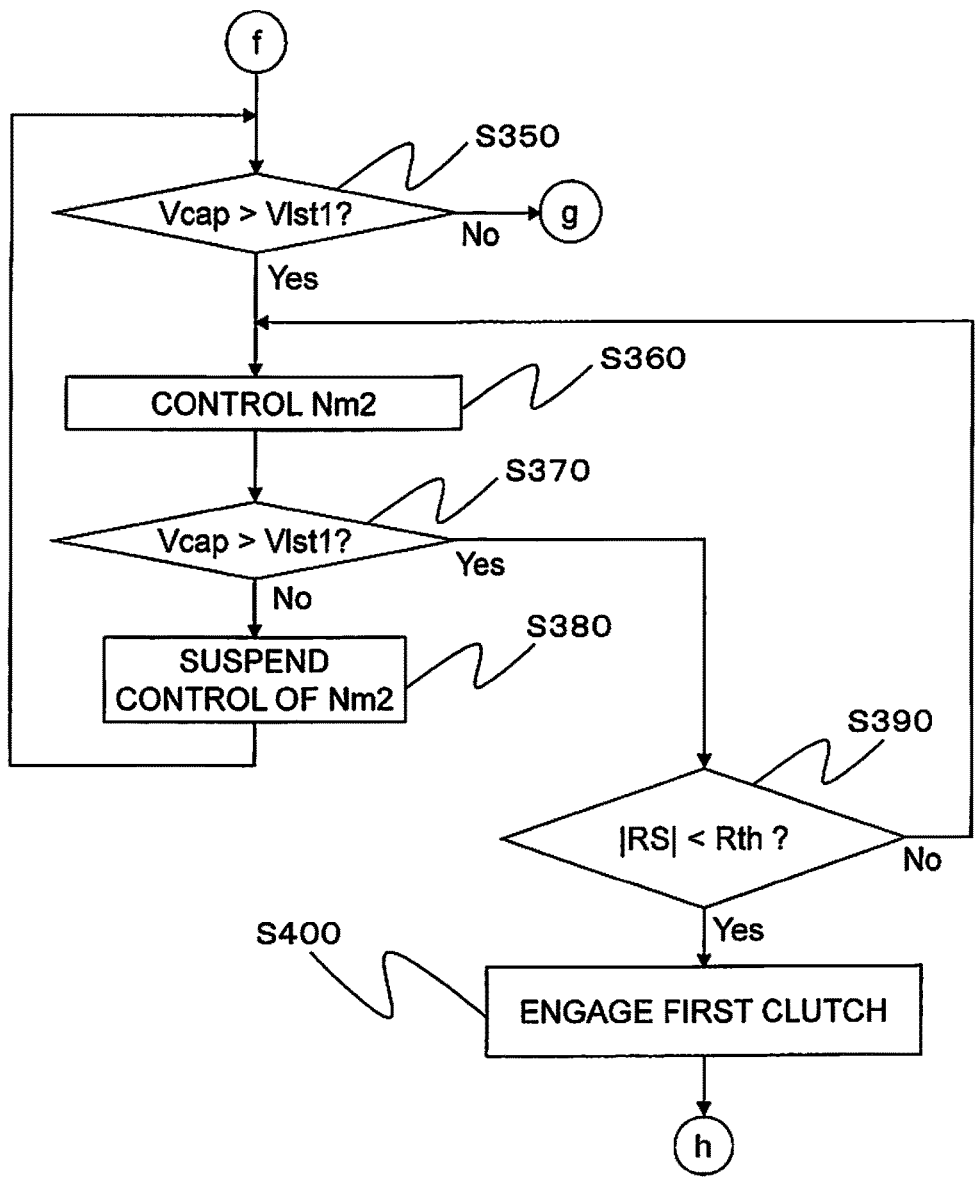
FIG. 6B is a flow chart illustrating an outline of operations of the controller according to the second exemplary embodiment.

After step S340 is completed, the controller 27 (the drive force conversion control section 83) ascertains whether or not the capacitor voltage Vcap is higher than a clutch synchronous control threshold Vlst1 in step S350 in FIG. 6B. In a case where the capacitor voltage Vcap is equal to or less than the clutch synchronous control threshold Vlst1, this has the meaning that there is not sufficient electrical power in the capacitor 64 for synchronizing rotation of the input shaft of the first clutch and the rotation of the output shaft of the first clutch by controlling the second motor MG2. In a case where the capacitor voltage Vcap is equal to or less than the clutch synchronous control threshold Vlst1 (NO in step S350), the flow proceeds to step S410 which will be described later. In a case where the capacitor voltage Vcap is larger than the clutch synchronous control threshold Vlst1 (YES in step S350), the controller 27 (the drive force conversion control section 83) controls the rotation speed Nm2 of the second motor MG2 so that the rotation speed of the output shafts 61f and 61r with regard to the rotation speed of the input shaft 61 in the first clutch (the relative rotation speed in the first clutch) becomes close to zero (step S360). That is, the controller 27 (the drive force conversion control section 83) rotates the second motor MG2 using the energy which is stored in the capacitor 64 so that the rotation speed of the output shafts 61f and 61r in the first clutch and the rotation speed of the input shaft 61 in the first clutch are synchronized.

Next, the controller 27 (the drive force conversion control section 83) ascertain whether or not the capacitor voltage Vcap is higher than the clutch synchronous control threshold Vlast1 during control of the second motor MG2 (step S370). When the capacitor voltage Vcap is equal to or less than the clutch synchronous control threshold Vlst1 (NO in step S370), control of the rotation speed Nm2 of the second motor MG2 is suspended (step S380) and the flow returns to step S350. In a case where the capacitor voltage Vcap is higher than the clutch synchronous control threshold Vlst1 (YES in step S370), the controller 27 ascertains whether or not the absolute value of a relative rotation speed RS of the first clutch is below a predetermined threshold Rth (here, Rth is a positive value) (step S390). Here, the controller 27 may ascertain whether or not −Rth<RS<Rth in step S390.

In a case where the absolute value of the relative rotation speed RS of the first clutch is equal to or more than the predetermined threshold Rth (NO in step S390), the flow proceeds to step S360. In a case where the absolute value of the relative rotation speed RS of the first clutch is smaller than the predetermined threshold Rth (YES in step S390), the controller 27 (the drive force conversion control section 83) controls the clutch pressure valve of the first clutch so that the clutch pressure in the first clutch is increased so that the first clutch is engaged without slipping (step S400). That is, the controller 27 (the drive force conversion control section 83) outputs a command signal for engaging the first clutch without slipping to the clutch control valve of the first clutch. That is, the controller 27 (the drive force conversion control section 83) engages the first clutch after synchronizing the rotation of the input and output rotating shafts of the first clutch. Due to this, wearing on the first clutch is reduced since the first clutch is engaged with a reduction in the differences in the rotation speeds in the first clutch. Here, the clutch pressure in the first clutch at this time is referred to as an engagement pressure.

Figure 6C:
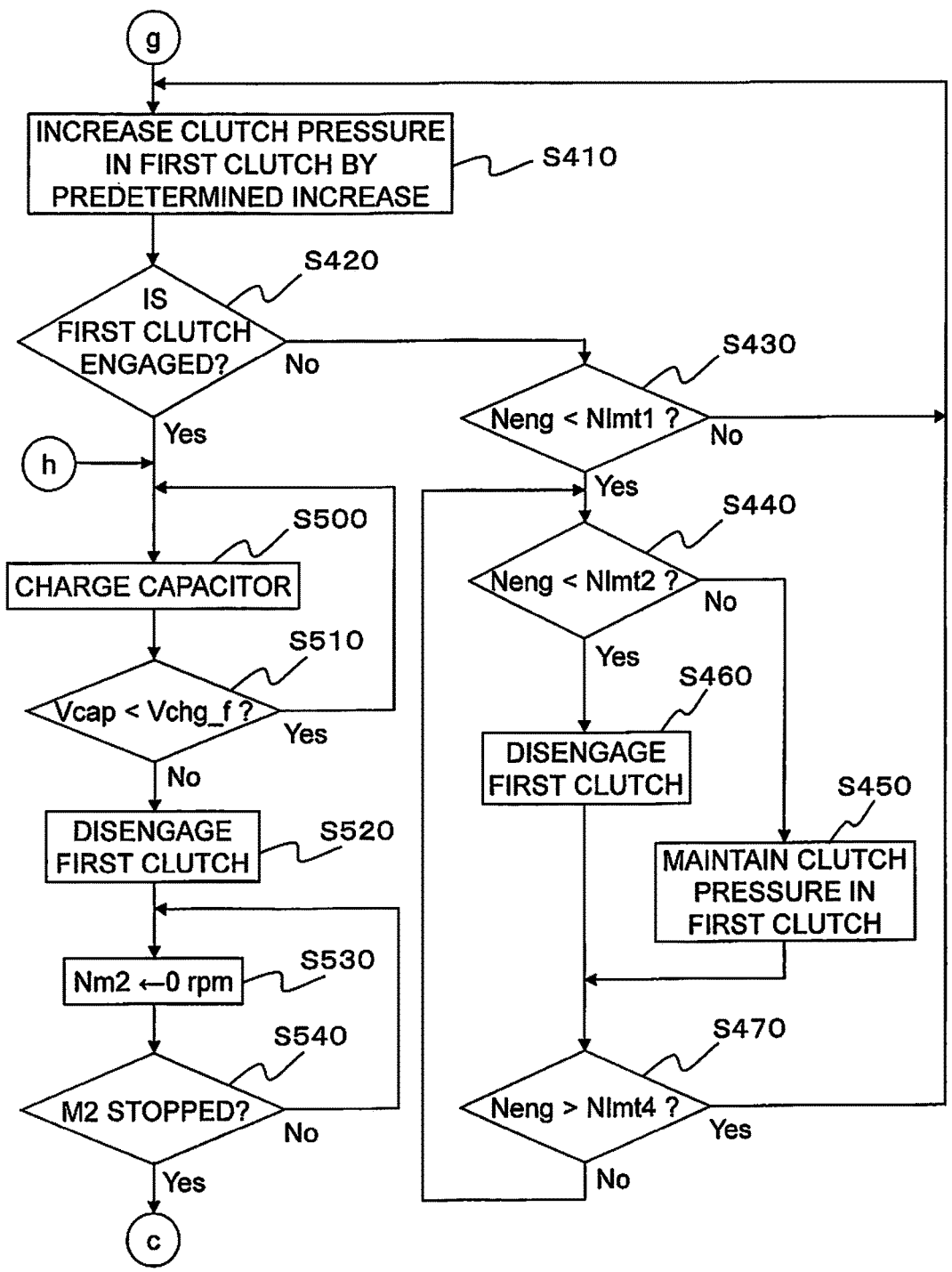
FIG. 6C is a flow chart illustrating an outline of operations of the controller according to the second exemplary embodiment.
Figure 6D:
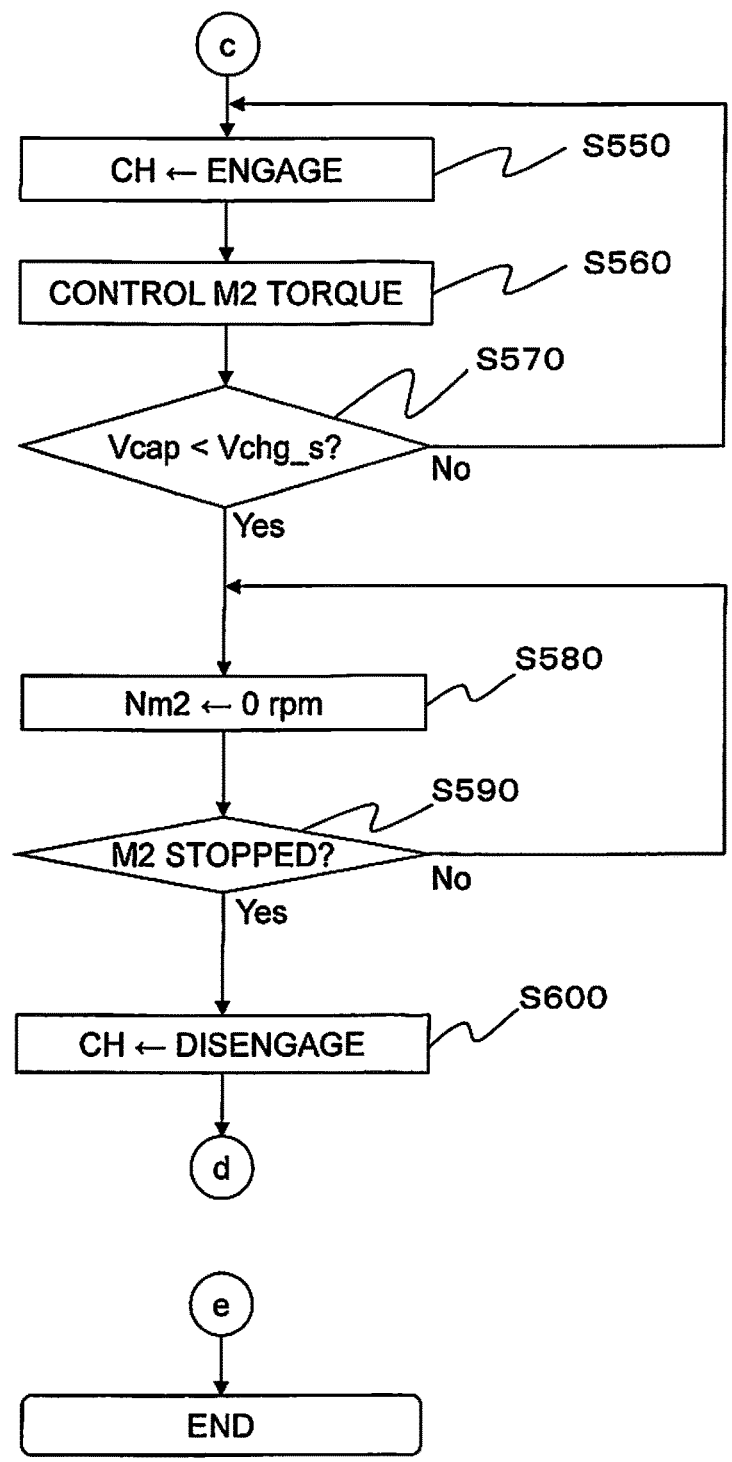
FIG. 6D is a flow chart illustrating an outline of operations of the controller according to the second exemplary embodiment.

On the other hand, in a case where the capacitor voltage Vcap is equal to or less than the clutch synchronous control threshold Vlst1 (YES in step S350), the controller 27 (the drive force conversion control section 83) controls the clutch control valve of the first clutch so that the clutch pressure in the first clutch is increased by a predetermined increase (step S410 in FIG. 6C). That is, the controller 27 (the drive force conversion control section 83) outputs a command signal for increasing the clutch pressure in the first clutch by a predetermined increase to the clutch control valve of the first valve. The controller 27 (the drive force conversion control section 83) connects the two rotating shafts of the first clutch with slipping by gradually increasing the clutch pressure in the first clutch. Due to this, the controller 27 (the drive force conversion control section 83) brings together the rotation speeds of the two rotating shafts of the first clutch. Then, the controller 27 (the drive force conversion control section 83) ascertains whether or not the first clutch is engaged (step S420). In detail, the controller 27 (the drive force conversion control section 83) ascertains whether or not the clutch pressure in the first clutch reaches an engagement pressure. The drive force conversion control section 83 may ascertain whether or not the engagement pressure is reached from the size of the current and the like in the command signal which is output from the clutch control valve of the first clutch. The rotation speeds of the two rotating shafts of the first clutch coincide when the first clutch is engaged.

In a case where the clutch pressure in the first clutch does not reach an engagement pressure (NO in step S420), the controller 27 (the drive force conversion control section 83) ascertains whether or not the engine rotation speed Neng is below the rotation speed Nlmt1 described above (step S430). A rotation speed which is smaller than the rotation speed Nlmt1 is a rotation speed where the possibility that the rotation speed will fall to the engine rotation speed Nlmt2 described above is high in a case where the clutches are engaged. In a case where the engine rotation speed Neng is equal to or more than the predetermined rotation speed Nlmt1 (NO in step S430), the flow returns to step S410. In a case where the engine rotation speed Neng is below the predetermined rotation speed Nlmt1 (YES in step S430), the controller 27 (the drive force conversion control section 83) ascertains whether or not the engine rotation speed Neng is below the predetermined rotation speed Nlmt2 (step S440). A rotation speed which is smaller than the rotation speed Nlmt2 is a rotation speed where concerns that the rotation speed will fall to a rotation speed where the engine 21 stops (stalls) are high.

In a case where the engine rotation speed Neng is equal to or more than the predetermined rotation speed Nlmt2 (NO in step S440), the controller 27 (the drive force conversion control section 83) controls the clutch control valve of the first clutch so that the clutch pressure in the first clutch is maintained (step S450). That is, the controller 27 (the drive force conversion control section 83) outputs a command signal for maintaining the clutch pressure in the first clutch to the clutch control valve of the first clutch. In a case where the engine rotation speed Neng is below the predetermined rotation speed Nlmt2 (YES in step S440), the controller 27 (the drive force conversion control section 83) controls the clutch control valve of the first clutch so that the first clutch is disengaged (step S460). That is, the drive force conversion control section 83 outputs a command signal for disengaging the first clutch to the clutch control valve of the first clutch.

After step S450 or step S460 is completed, the controller 27 ascertains whether or not the engine rotation speed Neng is above a rotation speed Nlmt4 (step S470). The rotation speed Nlmt4 is a value in the vicinity of the rotation speed of the engine 21 when the accelerator is off and there is no load. In a case where the engine rotation speed Neng is above the rotation speed Nlmt4 (YES in step S470), the flow returns to step S410. In a case where the engine rotation speed Neng is equal to or less than the rotation speed Nlmt4 (NO in step S470), the flow returns to step S440.

After the first clutch is engaged (after step S400 or at the time of YES in step S420), the controller 27 (the drive force conversion control section 83) performs an operation (S500) where the capacitor 64 is charged by the second motor MG2 being rotated using drive force of the engine 21. That is, the controller 27 (the drive force conversion control section 83) causes the second motor MG2 to generate energy and causes the capacitor 64 to store the generated energy.

Next, the controller 27 (the drive force conversion control section 83) ascertains whether or not the voltage Vcap in the capacitor 64 is lower than the full charge ascertaining threshold Vchg_f (step S510). In a case where the voltage Vcap in the capacitor 64 is lower than the full charge ascertaining threshold Vchg_f (YES in step S510), the flow returns to step S500. In a case where the voltage Vcap in the capacitor 64 is equal to or more than the full charge ascertaining threshold Vchg_f (NO in step S220), the controller 27 (the drive force conversion control section 83) controls the clutch control valve of the first clutch so that the engaging of the first clutch is cancelled (step S520). Next, the controller 27 (the drive force conversion control section 83) controls the second motor MG2 so that the rotation speed of the second motor MG2 is zero rpm (step S530). The controller 27 (the drive force conversion control section 83) ascertains whether or not the second motor MG2 stops from the rotation speed of the second motor MG2 which is detected using the second motor rotation speed detecting section 76 (step S540). In a case where the second motor does not stop (NO in step S540), the flow returns to step S530. In a case where the second motor stops (YES in step S540), the flow proceeds to step S550.

In steps S550 and S560, the controller 27 propels the work vehicle 1 using energy which is stored in the capacitor 64 since the capacitor 64 is charged up to the vicinity of the maximum value. In detail, the controller 27 (the connection modifying section 82) set the H clutch CH to an engagement state. That is, the controller 27 (the connection modifying section 82) sets the L clutch CL to a disengagement state and sets the H clutch CH to an engagement state. Due to this, the rotating shaft of one rotating element (the first ring gear R1) in the first planetary gear mechanism 68 and the rotating shaft of one rotating element (the second planetary gears P2) in the second planetary gear mechanism 69 are integrally operated.

Then, in step S560, the controller 27 (the drive force conversion control section 83) outputs torque which is set in advance with no relationship to the amount by which the accelerator is pressed which is detected by the acceleration regulation detecting section 51b. The torque is held in the memory section 56. However, the controller 27 (the drive force conversion control section 83) may carry out control so that torque is output to the second motor MG2 according to the amount by which the accelerator is pressed which is detected by the acceleration regulation detecting section 51b. In this case, the amount of torque which corresponds to the amount by which the accelerator is pressed is, for example, held in the memory section 56 as a table. Alternatively, the drive force conversion control section 83 may calculate torque from the amount by which the accelerator is pressed using a formula. In this manner, the controller 27 (the drive force conversion control section 83) drives the second motor MG2 to drive the output shaft 63.

Next, in step S550, the controller 27 (the drive force conversion control section 83) ascertains whether or not the voltage Vcap in the capacitor 64 is smaller than a charging start threshold Vchg_s. In a case where the capacitor voltage Vcap is equal to or more than the charging start threshold Vchg_s (NO in step S570), the flow returns to step S550. In a case where the capacitor voltage Vcap is smaller than the charging start threshold Vchg_s (YES in step S570), the controller 27 (the drive force conversion control section 83) controls the second motor MG2 so that the rotation speed of the second motor MG2 is zero rpm (step S580). That is, the controller 27 (the drive force conversion control section 83) terminates driving of the second motor MG2. The controller 27 (the drive force conversion control section 83) ascertains whether or not the second motor MG2 stops from the rotation speed of the second motor MG2 which is detected using the second motor rotation speed detecting section 76 (step S590). In a case where the second motor MG2 does not stop (NO in step S590), the flow returns to step S580. In a case where the second motor stops (YES in step S590), the controller 27 (the connection modifying section 82) sets the H clutch CH to a disengagement state in step S600. After step S600 is completed, the flow returns to step S320.

In the operation where the capacitor 64 described above is charged, the rotation speed threshold Nbond, the time period threshold Tbond, the clutch synchronous control threshold Vlst1, the charging start threshold Vchg_s, the rotation speed threshold Nlmt4, the clutch synchronous control threshold Vlst1, the relative rotation speed threshold Rth, the rotation speed threshold Nlmt1, the rotation speed threshold Nlmt2, and the full charge ascertaining threshold Vchg_f are set in advance and are stored in the memory section 56. In addition, Vlst1, Vchg_s, and Vchg_f establish the relationship in (equation 1). Furthermore, Nlmt4, Nlmt1, and Nlmt2 establish the relationship in (equation 2).

$$Vlst1 < Vchg\_s < Vchg\_f \quad \text{(equation 1)}$$

$$Nlmt2 < Nlmt1 < Nlmt4 \quad \text{(equation 2)}$$

Here, step S22 described above is equivalent to the step of the work vehicle 1 detecting if there is an anomaly in at least one of the motors out of the first motor MG1 and the second motor MG2. The steps S340, S550, and S600 are equivalent to the step of the work vehicle 1 modifying the connection relationships between the elements inside the power train 24 so that it is possible to transfer the output of the engine 21 to the output shaft 63 without at least one of the motors being driven by integrally operating the rotating shaft of the third rotating element (the first ring gear R1) and the rotating shaft of the fifth rotating element (the second planetary gears P2) using at least the rotating shaft fixing section RAF. In addition, steps S350 to S540 and S560 are equivalent to the work vehicle 1 controlling the variable transmission section VPF so that the output of the engine 21 can be converted to an appropriate drive force and the converted drive force can be transferred to the output shaft 63.

The work vehicle 1 according to the present exemplary embodiments have the following characteristics.

In the first exemplary embodiment, the anomaly detection section 81 detects if there is an anomaly in at least one of the first motor MG1 and the second motor MG2. Then, the connection modifying section 82 fixes the rotating shaft of one rotating element (the first ring gear R1) in the first planetary gear mechanism 68 and the rotating shaft of one rotating element (the second planetary gears P2) in the second planetary gear mechanism 69 using the rotating shaft fixing section RAF. Accordingly, the connection relationships between the elements inside the power train 24 are modified so that it is possible to transfer the output of the engine 21 to the output shaft 63 even when at least one of the motors where an anomaly is detected is not being driven. When the connection relationships are modified in this manner, the speed ratio is fixed. However, the drive force conversion control section 83 controls the variable transmission section VPF so that the drive force from the engine 21 can be converted to an appropriate drive force and the converted drive force can be transferred to the output shaft 63. Accordingly, it is possible for the work vehicle 1 to perform emergency travelling when an anomaly occurs in the motors MG1 and MG2. Furthermore, it is possible for the work vehicle 1 to increase vehicle speed due to the engine rotation speed being increased in accordance with an intention of an operator to increase speed when the output section 61f or 61r outputs drive force which is the same as the input section 61 in the variable transmission section VPF.

In the first exemplary embodiment, the rotating shaft fixing section RAF includes the H clutch CH and the L clutch CL. Then, the connection modifying section 82 sets both the H clutch CH and the L clutch CL to an engagement state. As a result, the rotating shaft of one rotating element (the first ring gear R1) in the first planetary gear mechanism 68 and the rotating shaft of one rotating element (the second planetary gears P2) in the second planetary gear mechanism 69 are fixed.

In the first exemplary embodiment, the variable transmission section VPF includes the first clutch that is one of the F clutch CF or the R clutch CR. The drive force conversion control section 83 carries out control so that the clutch pressure in the first clutch is gradually increased when the work vehicle 1 sets off. Due to this, it is possible to suppress engine stalling since sudden increases in engine load when connecting the first clutch are avoided. Furthermore, engine stalling is further suppressed when the engine rotation speed falls to the extent that concerns that the engine will stop become high since the drive force conversion control section 83 performs suspension of increases in the clutch pressure or performs lowering of the clutch pressure.

In the first exemplary embodiment, the variable transmission section VPF includes the second clutch that is one of the H clutch CH or the L clutch CL. The drive force conversion control section 83 carries out control so that the clutch pressure in the second clutch is gradually increased when the work vehicle 1 sets off. Due to this, it is possible to suppress engine stalling since sudden increases in engine load when connecting the second clutch are avoided. Furthermore, engine stalling is further suppressed when the engine rotation speed falls to the extent that concerns that the engine will stop become high since the drive force conversion control section 83 performs suspension of increases in the clutch pressure or performs lowering of the clutch pressure.

In the first exemplary embodiment, the controller carries out control so that the rotation speed of the engine 21 does not exceed the predetermined upper limit value Nlmt3 when performing an operation of the connection modifying section 82 or control by the drive force conversion control section 83. When the engine rotation speed is large, the speed differential between the input section 61 and the output section 61f or 61r of the variable transmission section VPF becomes large and the amount of heat generated when the input section 61 and the output section 61f or 61r are connected while slipping becomes large. It is possible to suppress wearing in the variable transmission section VPF and prevent burning in the variable transmission section VPF since the amount of heat generated is suppressed due to the rotation speed of the engine 21 being controlled to not exceed the predetermined upper limit value Nlmt3.

In the second exemplary embodiment, the connection modifying section 82 sets at least the L clutch CL to a disengagement state when the anomaly detection section 81 detects an anomaly that the first motor MG1 is unable to rotate. It is preferable that the connection modifying section 82 set both the H clutch CH and the L clutch CL to a disengagement state. Then, the drive force conversion control section 83 carries out control so that the clutch pressure in the first clutch, which is one of the F clutch CF and the R clutch CR, is increased. Then, the drive force conversion control section 83 causes the second motor MG2 to generate energy after the first clutch is engaged and causes the capacitor 64 to store the generated energy. Due to this, it is possible for the work vehicle 1 to store energy which drives the second motor MG2 in the capacitor 64.

In the second exemplary embodiment, the connection modifying section 82 disengages the L clutch CL and engages the H clutch CH when energy which is equal to or more than the predetermined full charge ascertaining threshold Vchg_f is stored in the capacitor 64. The drive force conversion control section 83 cancels the engaging of the first clutch, drives the second motor MG2 using the energy stored in the capacitor 64 to drive the output shaft 63. Due to this, it is possible for the work vehicle 1 to be propelled to move by the second motor MG2 being driven using energy which is stored in the capacitor 64.

In the second exemplary embodiment, the drive force conversion control section 83 stops driving of the second motor MG2 when the capacitor 64 is below the predetermined charging start threshold Vchg_s. The connection modifying section 82 sets the H clutch CH to a disengagement state. The drive force conversion control section 83 carries out control so that the clutch pressure in the first clutch is increased. Then, the drive force conversion control section 83 causes the second motor MG2 to generate energy after engaging of the first clutch and causes the capacitor 64 to store the generated energy. Due to this, it is possible for the work vehicle 1 to be propelled to move intermittently by desired distances.

In the second exemplary embodiment, the drive force conversion control section 83 engages the first clutch after the second motor MG2 is rotated using energy which is stored in the capacitor 64 so that rotation of input and output rotating shafts of the first clutch are synchronized when the energy which is stored in the capacitor 64 is larger than the clutch synchronous control threshold Vlst1 which is smaller than the charging start threshold Vchg_s. Then, the drive force conversion control section 83 carries out control so that the clutch pressure in the first clutch is gradually increased and engages the first clutch when the energy which is stored in the capacitor 64 is equal to or less than the clutch synchronous control threshold Vlst1. Due to this, damage to the first clutch is suppressed since the first clutch is engaged after rotation of the input and output rotating shafts of the first clutch are synchronized using rotation of the second motor MG2 during charging after the work vehicle 1 is propelled to move once. In addition, it is possible to engage the first clutch due to the clutch pressure in the first clutch being gradually increased even in a case where the amount of energy in the capacitor 64 is low before travelling of the work vehicle 1.

Exemplary embodiments of the present invention are described above, but the present invention is not limited to the exemplary embodiments described above and various modifications are possible within a scope which does not depart from the gist of the invention.

The present invention is not limited to a wheel loader as described above and may be applied to other types of work vehicles such as a bulldozer, a tractor, a forklift, or a motor grader.

The present invention is not limited to an EMT but may be applied to other types of transmission apparatuses, such as an HMT. In this case, the first motor MG1 functions as a hydraulic motor and a hydraulic pump. In addition, the second motor functions as a hydraulic motor and a hydraulic pump. The first motor MG1 and the second motor MG2 are variable capacity pumps and motors and the capacities are controlled by controlling the tilt angles of swash plates or swash shafts using the controller 27. In the case that the present invention is applied to an HMT, an actuator may be utilized as the energy storage section instead of the capacitor 64. That is, hydraulic energy generated by the second motor MG2 may be stored in the accumulator and the hydraulic energy which is stored in the accumulator may be consumed by the second motor MG2.

In the present exemplary embodiments, the first to sixth rotating elements are respectively the first sun gear S1, the first planetary gears P1, the first ring gear R1, the second sun gear S2, the second planetary gears P2, and the second ring gear R2. However, the first to third rotating elements may be any combination of the rotating elements in the first planetary gear mechanism 68 as long as the rotating elements are different to each other. The fourth to sixth rotating elements may be any combination of the rotating elements in the second planetary gear mechanism 69 as long as the rotating elements are different to each other. In addition, the positional relationship between the first carrier C1 and the second carrier C2 in the first planetary gear mechanism 68 and the second planetary gear mechanism 69 may be reversed. In the same manner, the first motor MG1 and the second motor MG2 are terms which are provided to distinguish between each of the motors, and the motor which is referred to as the first motor MG1 in the present exemplary embodiments may be referred to as the second motor MG2 and the motor which is referred to as the second motor MG2 in the present exemplary embodiments may be referred to as the first motor MG1.

It is possible for the steps S16, S30 to S45, S53, S57, S70 to S80, and S600 to be appropriately omitted from the exemplary embodiments described above.

The exemplary embodiments described above illustrate an example where the number of the planetary gear mechanisms which are provided in the power train is two, but the number of the planetary gear mechanisms which are provided in the power train may be three or more.

The FR switching mechanism 65 described above is provided between the engine 21 and the gearing mechanism 66, 66a, but may be provided between the gearing mechanism 66, 66a, and the axle 45. In this case, the control method using the controller 27 during the emergency travelling method described above does not change.

In the second exemplary embodiment, the work vehicle 1 may be propelled to move due to the first clutch and the H clutch CH being engaged during charging of the capacitor 64. Here, the speed of the work vehicle 1 in this case becomes a speed where travelling is possible by rotating the engine 21 to the extent that the engine 21 does not stop (stall).

It is possible for a hybrid work vehicle according to exemplary embodiments of the present invention to perform emergency travelling when an anomaly occurs in an internal device (in particular, a motor).

The invention claimed is:

1. A work vehicle comprising:
an engine;
a hydraulic pump driven by the engine;
a working implement driven using hydraulic oil discharged from the hydraulic pump;
a travelling apparatus driven by the engine;
a power train configured to transfer a drive force from the engine to the travelling apparatus; and
a controller configured to control the power train, the power train including an input shaft, an output shaft, a gear mechanism, a first motor, a second motor, a rotating shaft fixing section, a transmission section, and a variable transmission section, the rotation speed ratio of the output shaft with regard to the input shaft in the power train changing due to changes in the rotation speed of the first motor or the second motor, the gear mechanism being configured to transfer rotation of the input shaft to the output shaft, the gear mechanism including a first planetary gear mechanism and a second planetary gear mechanism, the first planetary gear mechanism including a first rotating element, a second rotating element, and a third rotating element which are different from each other, the second planetary gear mechanism including a fourth rotating element, a fifth rotating element, and a sixth rotating element which are different from each other, the engine being connectable with the first rotating element via the input shaft, the transmission section being able to transfer a drive force of the second rotating element to the fourth rotating element, the rotating shaft fixing section being able to integrally operate a rotating shaft of the third rotating element and a rotating shaft of the fifth rotating element, the output shaft being connected with the sixth rotating element, the variable transmission section including an input section where drive force is input and an output section configured to output drive force equal to or less than the input drive force, and the controller including an anomaly detection section configured to detect whether there is an anomaly in at least one of the motors out of the first motor and the second motor, a connection modifying section configured to modify connection relationships between elements inside the power train to transfer an output of the engine to the output shaft without at least one of the motors being driven, by integrally operating the rotating shaft of the third rotating element and the rotating shaft of the fifth rotating element using at least the rotating shaft fixing section, and a drive force conversion control section configured to control the variable transmission section to enable the output of the engine to be converted to an appropriate drive force and the converted drive force to be transferred to the output shaft.

2. The work vehicle according to claim 1, wherein the rotating shaft fixing section includes
an L clutch connectable to a fixed end; and
an H clutch connectable to the third rotating element and the fifth rotating element.

3. The work vehicle according to claim 2, wherein the connection modifying section is configured to set both the L clutch and the H clutch to an engagement state.

4. The work vehicle according to claim 3,
the variable transmission section including a first clutch that is one of an F clutch configured to connect with the gear mechanism to drive the travelling apparatus in a forward direction, or an R clutch configured to connect with the gear mechanism to drive the travelling apparatus in a reverse direction, and the drive force conversion control section is configured to carry out control so that the clutch pressure in the first clutch is gradually increased when the work vehicle sets off.

5. The work vehicle according to claim 3,
the variable transmission section including a second clutch that is one of the H clutch or the L clutch, wherein
the drive force conversion control section is configured to carry out control so that the clutch pressure in the second clutch is gradually increased after engaging of a third clutch that is the other of the H clutch and the L clutch when the work vehicle sets off.

6. The work vehicle according to claim 1, wherein
the controller is configured to carry out control so that the rotation speed of the engine does not exceed a predetermined upper limit value when performing an operation of the connection modifying section or control by the drive force conversion control section.

7. The work vehicle according to claim 2, further comprising
an energy storage section configured to store energy generated by at least the second motor, the energy storage section being configured to output the energy to at least the second motor, the variable transmission section including a first clutch that is one of an F clutch configured to connect with the gear mechanism to drive the travelling apparatus in a forward direction, or an R clutch configured to connect with the gear mechanism to drive the travelling apparatus in a reverse direction, and when the anomaly detection section detects an anomaly that the first motor is unable to rotate, the connection modifying section being configured to set at least the L clutch to a disengagement state and the drive force conversion control section being configured to carry out control so that the clutch pressure in the first clutch is increased, to cause the second motor to generate energy after the first clutch is engaged, and to cause the energy storage section to store the generated energy.

8. The work vehicle according to claim 7, wherein
when the energy storage section stores energy equal to or more than a predetermined first amount, the connection modifying section is configured to set the L clutch to a disengagement state and to set the H clutch to an engagement state, and the drive force conversion control section is configured to cancel the engaging of the first clutch and to drive the second motor using the energy stored in the energy storage section to drive the output shaft.

9. The work vehicle according to claim 8, wherein
when the energy stored in the energy storage section is below a predetermined second amount smaller than the first amount, the drive force conversion control section is configured to terminate driving of the second motor, the connection modifying section is configured to set the H clutch to a disengagement state, and the drive force conversion control section is configured to carry out control so that the clutch pressure in the first clutch is increased, to cause the second motor to generate energy from the drive force of the engine after engaging of the first clutch, and to cause the energy storage section to store the generated energy.

10. The work vehicle according to claim 9, wherein
when the energy stored in the energy storage section is larger than a third amount that is smaller than the second amount, the drive force conversion control section engages the first clutch after causing the second motor to rotate using energy stored in the energy storage section so that rotation of input and output rotating shafts of the first clutch are synchronized, and when the energy stored in the energy storage section is equal to or less than the third amount, the drive force conversion control section engages the first clutch by carrying out control so that the clutch pressure in the first clutch is gradually increased.

11. A control method for a work vehicle,
the work vehicle comprising an engine, a hydraulic pump driven by the engine, a working implement driven using hydraulic oil discharged from the hydraulic pump, a travelling apparatus driven by the engine, and a power train configured to transfer a drive force from the engine to the travelling apparatus,
  the power train including an input shaft, an output shaft, a gear mechanism, a first motor, a second motor, a rotating shaft fixing section, a transmission section, and a variable transmission section,
  the rotation speed ratio of the output shaft with regard to the input shaft in the power train changing due to changes in the rotation speed of the first motor or the second motor,
  the gear mechanism being configured to transfer rotation of the input shaft to the output shaft,
  the gear mechanism including a first planetary gear mechanism and a second planetary gear mechanism,
  the first planetary gear mechanism including a first rotating element, a second rotating element, and a third rotating element which are different from each other,
  the second planetary gear mechanism including a fourth rotating element, a fifth rotating element, and a sixth rotating element which are different from each other,
  the engine being connectable with the first rotating element via the input shaft,
  the transmission section being able to transfer a drive force of the second rotating element to the fourth rotating element,
  the rotating shaft fixing section being able to integrally operate a rotating shaft of the third rotating element and a rotating shaft of the fifth rotating element,
  the output shaft being connected with the sixth rotating element, and
  the variable transmission section including an input section where drive force is input and an output section configured to output drive force equal to or less than the input drive force,
the control method comprising:
  a step of the work vehicle detecting whether there is an anomaly in at least one of the motors out of the first motor and the second motor;
  a step of the work vehicle modifying connection relationships between elements inside the power train to transfer the output of the engine to the output shaft without at least one of the motors being driven, by integrally operating the rotating shaft of the third rotating element and the rotating shaft of the fifth rotating element using at least the rotating shaft fixing section; and
  a step of the work vehicle controlling the variable transmission section to enable an output of the engine to be converted to an appropriate drive force and the converted drive force to be transferred to the output shaft.

12. The control method for the work vehicle according to claim 11, wherein
  the rotating shaft fixing section includes an L clutch connectable to a fixed end and an H clutch connectable to the third rotating element and the fifth rotating element, and
  in the step of the work vehicle modifying the connection relationships, the work vehicle sets both the L clutch and the H clutch to an engagement state.

13. The control method for the work vehicle according to claim 11, wherein
  the work vehicle is further provided with an energy storage section configured to store energy generated by at least the second motor, the energy storage section being configured to output the energy to at least the second motor,
  the rotating shaft fixing section includes an L clutch connectable to a fixed end and an H clutch connectable to the third rotating element and the fifth rotating element,
  the variable transmission section includes a first clutch that is one of an F clutch configured to connect with the gear mechanism to drive the travelling apparatus in a forward direction, and an R clutch configured to connect with the gear mechanism to drive the travelling apparatus in a reverse direction,
  in the step of the work vehicle detecting whether there is an anomaly in at least one of the motors, the work vehicle detects an anomaly that the first motor is unable to rotate,
  in the step of the work vehicle controlling the variable transmission section, the work vehicle sets at least the L clutch to a disengagement state, and
  in the step of the work vehicle controlling the variable transmission section, the work vehicle carries out control so that the clutch pressure in the first clutch is increased, causes the second motor to generate energy after the first clutch is engaged, and causes the energy storage section to store the generated energy.

14. The control method for the work vehicle according to claim 13, wherein
  when the energy storage section stores the energy equal to or more than a predetermined first amount,
  in the step of the work vehicle modifying the connection relationships, the work vehicle sets the L clutch to a disengagement state and sets the H clutch to an engagement state, and
  in the step of the work vehicle controlling the variable transmission section, the work vehicle cancels the engaging of the first clutch, drives the second motor using the energy stored in the energy storage section to drive the output shaft.

* * * * *